(12) United States Patent
Davis

(10) Patent No.: US 12,724,855 B2
(45) Date of Patent: Sep. 1, 2026

(54) SYSTEMS AND METHODS FOR DIGITAL ASSET MANAGEMENT

(71) Applicant: Tenable, Inc., Columbia, MD (US)

(72) Inventor: Sashka T. Davis, Vienna, VA (US)

(73) Assignee: Tenable, Inc., Columbia, MD (US)

( * ) Notice: Subject to any disclaimer, the term of this patent is extended or adjusted under 35 U.S.C. 154(b) by 18 days.

(21) Appl. No.: 18/778,738

(22) Filed: Jul. 19, 2024

(65) Prior Publication Data

US 2026/0023826 A1 Jan. 22, 2026

(51) Int. Cl.
*G06F 21/10* (2013.01)

(52) U.S. Cl.
CPC .................................. *G06F 21/105* (2013.01)

(58) Field of Classification Search
CPC .................................................... G06F 21/105
USPC ........................................................... 726/26
See application file for complete search history.

(56) References Cited

U.S. PATENT DOCUMENTS 11,537,283 B2 * 12/2022 Gonzalez .............. G06F 40/197
2012/0311034 A1 * 12/2012 Goldband .......... G06Q 30/0201
709/204
2020/0128016 A1 * 4/2020 Blass .................... H04L 63/101
2021/0141932 A1 * 5/2021 Barday ................. G06F 16/125
2022/0021668 A1 * 1/2022 Gautam ................ H04L 63/105
2023/0260384 A1 * 8/2023 Haines .................... H04W 8/16
455/411
2023/0388329 A1 * 11/2023 Agarwal .................. G06N 5/04
2024/0062051 A1 * 2/2024 Baran Pouyan ....... G06N 20/20
2024/0130621 A1 * 4/2024 Islam ................... A61B 5/0088
2024/0289233 A1 * 8/2024 Grigoras ............. G06F 11/1464
2024/0370957 A1 * 11/2024 Ryan .................... G06Q 50/184
2024/0386066 A1 * 11/2024 Sun ..................... G06F 16/9536

* cited by examiner

*Primary Examiner* — Michael S McNally

(74) *Attorney, Agent, or Firm* — Muncy, Geissler, Olds & Lowe, P.C.; Daniel Podhajny

(57) ABSTRACT

In some aspects, a component may generate an identification for a personal account based at least in part on user-asset heuristics, wherein the personal account is heuristically distinguished from an administrative account based at least in part on a number of users associated with an account that is either the personal account or the administrative account. The component may determine an owner identity of the owner associated with the personal account by linking the identification with an identity in a data source based at least in part on one or more heuristically determined identity attributes.

50 Claims, 13 Drawing Sheets

100
160
130
170
Cloud Scanner
Network Device
140
150
Vulnerability Management System
120
110
Active Scanner

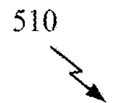
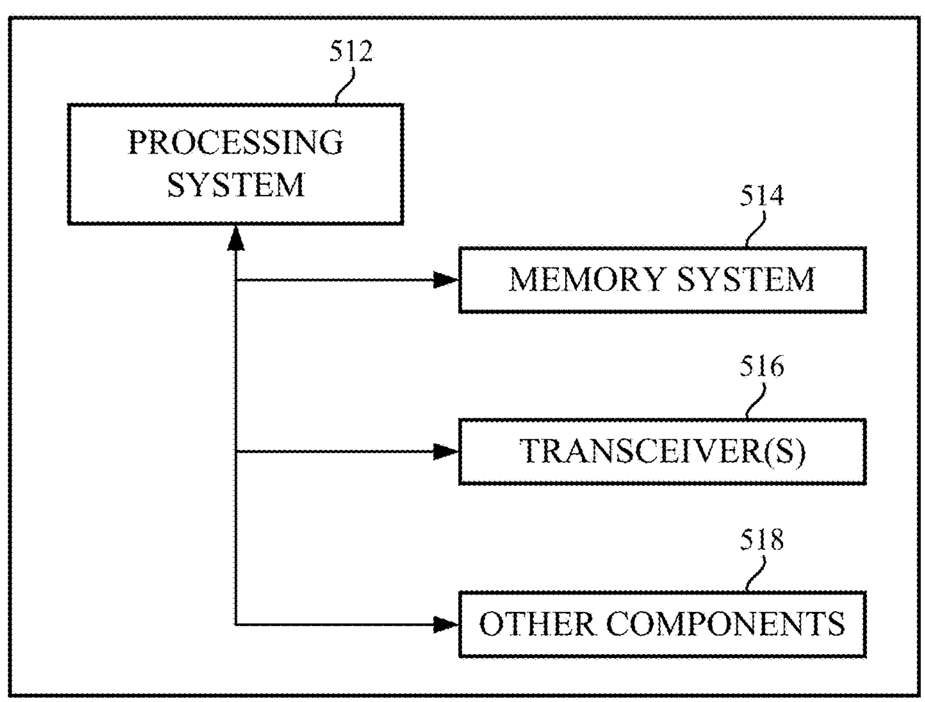
FIG. 5

Figure 8:
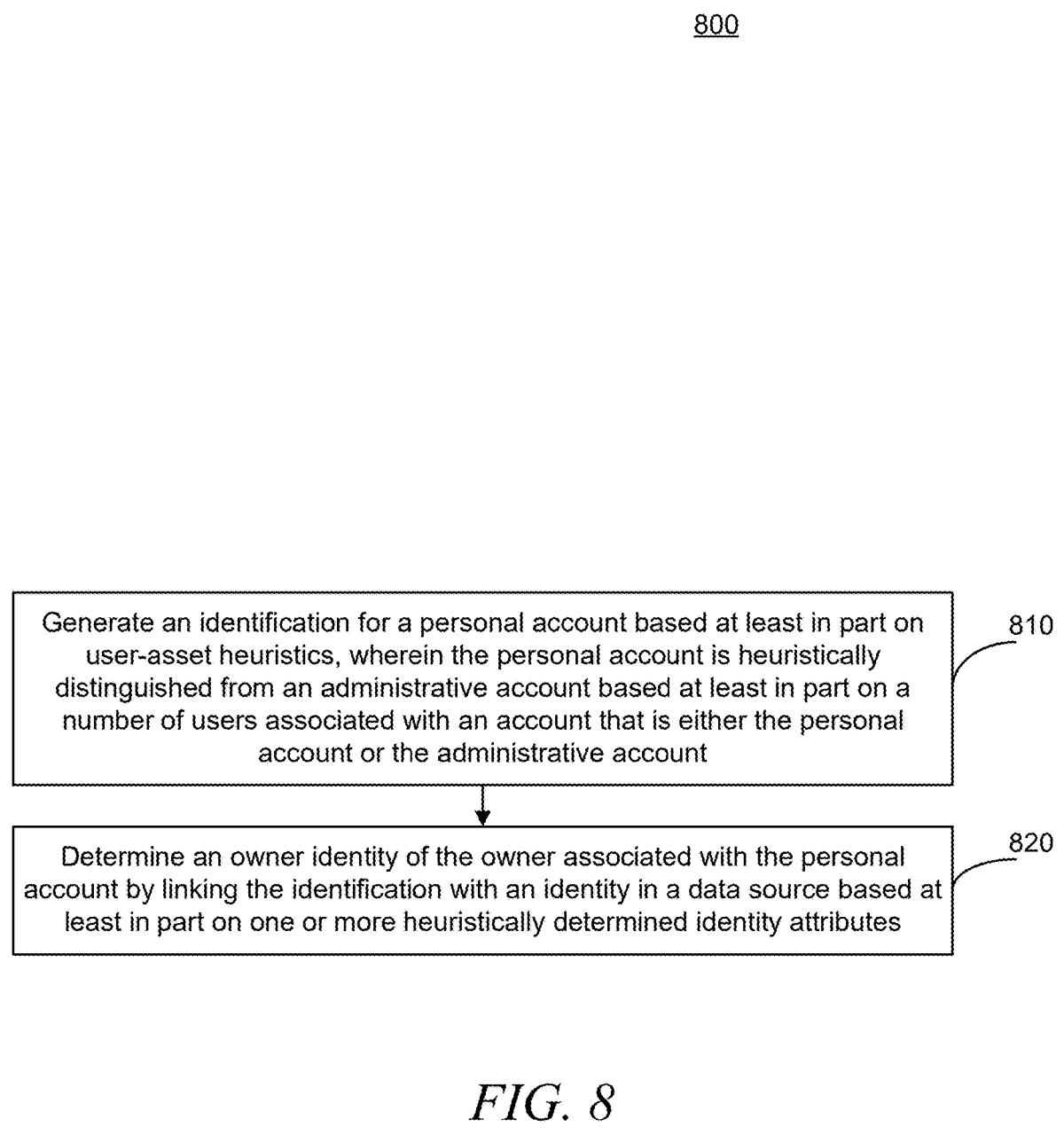

800

Generate an identification for a personal account based at least in part on user-asset heuristics, wherein the personal account is heuristically distinguished from an administrative account based at least in part on a number of users associated with an account that is either the personal account or the administrative account

810

Determine an owner identity of the owner associated with the personal account by linking the identification with an identity in a data source based at least in part on one or more heuristically determined identity attributes

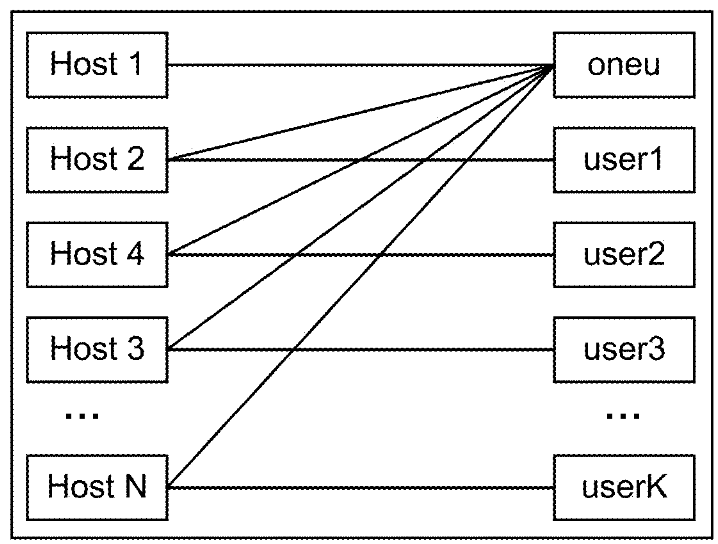
*FIG. 11*

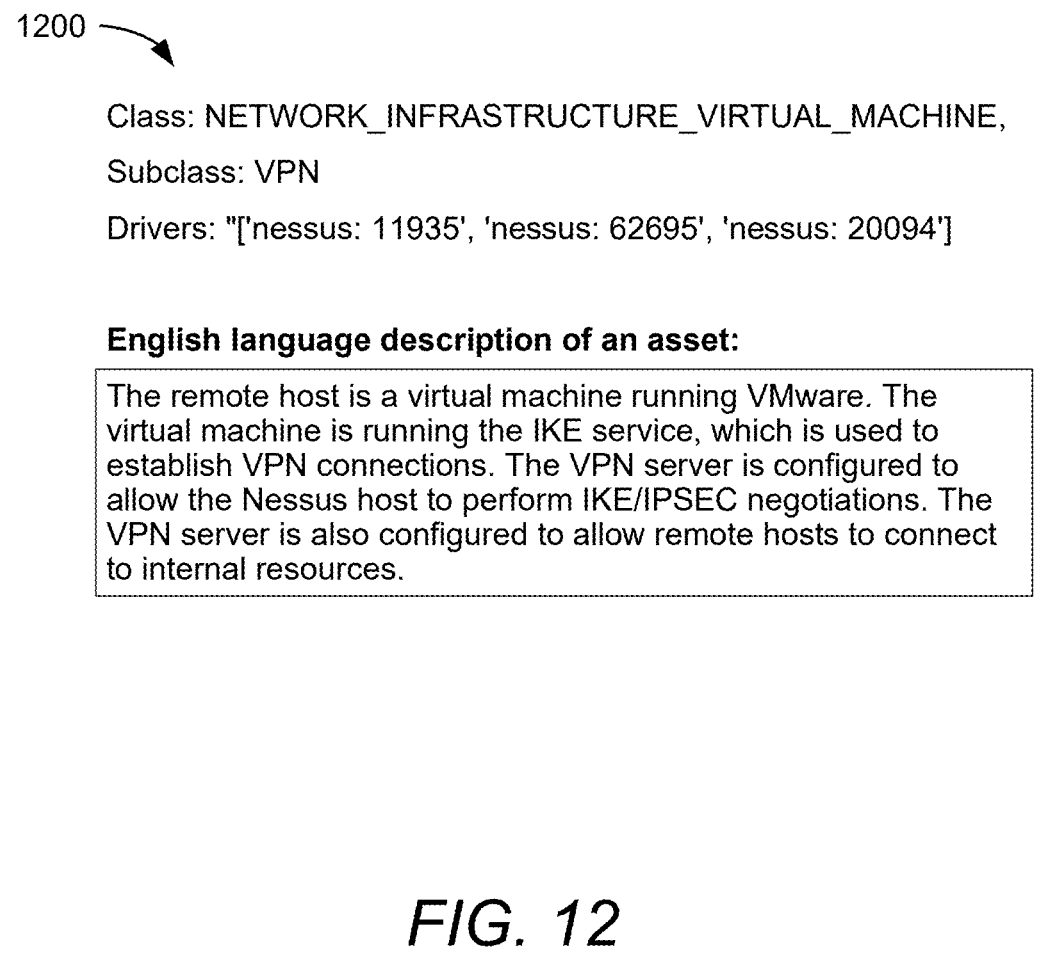

1200

Class: NETWORK_INFRASTRUCTURE_VIRTUAL_MACHINE,

Subclass: VPN

Drivers: "['nessus: 11935', 'nessus: 62695', 'nessus: 20094']

English language description of an asset:

The remote host is a virtual machine running VMware. The virtual machine is running the IKE service, which is used to establish VPN connections. The VPN server is configured to allow the Nessus host to perform IKE/IPSEC negotiations. The VPN server is also configured to allow remote hosts to connect to internal resources.

*FIG. 12*

SYSTEMS AND METHODS FOR DIGITAL ASSET MANAGEMENT

BACKGROUND OF THE DISCLOSURE

1. Field of the Disclosure

Aspects relate to system and methods to facilitate digital asset management.

2. Description of the Related Art

Organizations such as corporate, government or nonprofit entities may have a large number of employees or contractors using various personal computing devices (PCDs) such as desktop computers, laptop computers, tablets, and mobile phones. Some of these devices may be owned by the organization while others may be bring-your-own devices (BOYDs). PCDs used by individual employees or contractors may run vastly different operating systems and application software. Some organizations may own or use multiple databases, servers, platforms, cloud storages, or various types of computing infrastructure. It is often difficult to keep track of the ownership, usage rights, and administrative rights of digital assets within an organization, which is important for various purposes from an organizational standpoint, including, for example, digital asset inventory control, cybersecurity, vulnerability management, and access control or prevention. To address this issue, some organizations may use large numbers of spreadsheets in an attempt to keep track of digital assets, which is often time-consuming and prone to human errors. Some organizations may use configuration management databases (CMDBs) to manage digital assets. However, large entities may need to use multiple CMDBs which may not be constantly synchronized or may have conflicting information regarding digital assets.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In some aspects, a method of determining an owner of a digital asset includes generating an identification for a personal account based at least in part on user-asset heuristics, wherein the personal account is heuristically distinguished from an administrative account based at least in part on a number of users associated with an account that is either the personal account or the administrative account; and determining an owner identity of the owner associated with the personal account by linking the identification with an identity in a data source based at least in part on one or more heuristically determined identity attributes.

In some aspects, a component includes one or more memories; and one or more processors communicatively coupled to the one or more memories, the one or more processors, either alone or in combination, configured to: generate an identification for a personal account based at least in part on user-asset heuristics, wherein the personal account is heuristically distinguished from an administrative account based at least in part on a number of users associated with an account that is either the personal account or the administrative account; and determine an owner identity of the owner associated with the personal account by linking the identification with an identity in a data source based at least in part on one or more heuristically determined identity attributes.

In some aspects, a non-transitory computer-readable medium storing computer-executable instructions that, when executed by a component, cause the component to: generate an identification for a personal account based at least in part on user-asset heuristics, wherein the personal account is heuristically distinguished from an administrative account based at least in part on a number of users associated with an account that is either the personal account or the administrative account; and determine an owner identity of the owner associated with the personal account by linking the identification with an identity in a data source based at least in part on one or more heuristically determined identity attributes.

In some aspects, a component includes means for generating an identification for a personal account based at least in part on user-asset heuristics, wherein the personal account is heuristically distinguished from an administrative account based at least in part on a number of users associated with an account that is either the personal account or the administrative account; and means for determining an owner identity of the owner associated with the personal account by linking the identification with an identity in a data source based at least in part on one or more heuristically determined identity attributes.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which:

FIG. 5 generally illustrates a user equipment (UE) in accordance with aspects of the disclosure.

FIG. 8 illustrates a process, in accordance with aspects of the disclosure.

FIG. 11 illustrates a user-asset graph, according to aspects of the disclosure.

FIG. 12 illustrates an example of English-language description 1200 of an asset and justification of class/subclass assignment, according to aspects of the disclosure.

Figure 1:
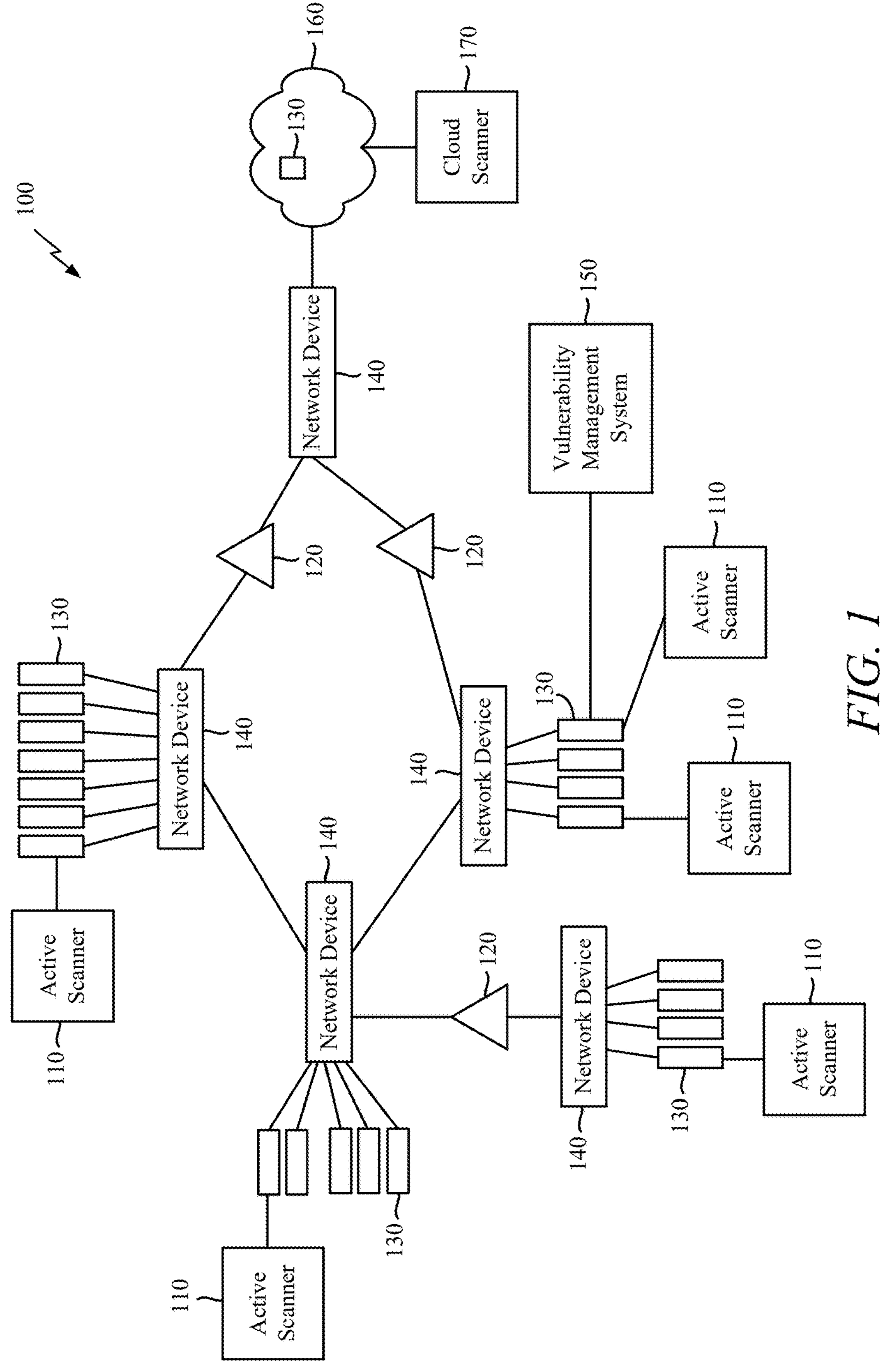
FIG. 1 illustrates an exemplary network having various assets that can be managed using a vulnerability management system, according to various aspects.

The accompanying drawings are presented to aid in the description of various aspects of the disclosure and are provided solely for illustration of the aspects and not limitation thereof.

DETAILED DESCRIPTION

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, a set-top box or media player, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof. Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes. Further, assets may encompass tangential network aspects such as policies, rules and so forth.

Assets may also be implemented within or as part of cloud network architecture (e.g., cloud assets may correspond to instances or virtual machines (VMs), particular devices or groups of devices, distributed resources across multiple devices and/or locations, etc.) By way of examples, cloud assets may include, but are not limited to, any of the following examples which are characterized with respect to AMAZON, GOOGLE and MICROSOFT cloud services (e.g., Amazin Web Services, Microsoft Azure, Google Cloud), e.g.:

'aws_athena_database'
'aws_db_instance'
'aws_db_snapshot'
'aws_dynamodb_table'
'aws_ecr_repository'
'aws_ecr_repository_policy'
'aws_ecs_cluster'
'aws_ecs_service'
'aws_eks_cluster'
'aws_elb'
'aws_emr_cluster'
'aws_instance'
'aws_nat_gateway'
'aws_rds_cluster'
'aws_rds_cluster_instance'
'aws_redshift_cluster'
'aws_s3_bucket'
'aws_s3_bucket_policy'
'azurerm_container_group'
'azurerm_container_registry'
'azurerm_kubernetes_cluster'
'azurerm_lb'
'azurerm_linux_virtual_machine'
'azurerm_mariadb_server'
'azurerm_mssql_server'
'azurerm_mssql_virtual_machine'
'azurerm_mysql_database'
'azurerm_mysql_server'
'azurerm_postgresql_database'
'azurerm_postgresql_server'
'azurerm_sql_database'
'azurerm_sql_server'
'azurerm_storage_container'
'azurerm_virtual_machine_scale_set'
'azurerm_windows_virtual_machine'
'google_bigquery_dataset'
'google_bigquery_table'
'google_compute_forwarding_rule'
'google_compute_global_forwarding_rule'
'google_compute_instance'
'google_container_cluster'
'google_container_registry'
'google_sql_database'
'google_sql_database_instance'
'google_storage_bucket'
'kubernetes_cluster'
'kubernetes_pod'

According to various aspects, FIG. 1 illustrates an exemplary network 100 having various assets 130 that are interconnected via one or more network devices 140 and managed using a vulnerability management system 150. More particularly, as noted above, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

According to various aspects, the assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations. Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived asses-like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100.

More particularly, the network 100 may include one or more active scanners 110 configured to communicate packets or other messages within the network 100 to detect new or changed information describing the various network devices 140 and other assets 130 in the network 100. For example, in one implementation, the active scanners 110 may perform credentialed audits or uncredentialed scans to scan certain assets 130 in the network 100 and obtain information that may then be analyzed to identify potential vulnerabilities in the network 100. As used herein "credentialed" scans rely upon user credential(s) for authentication. Credentialed scans can perform a wider variety of checks than non-credentialed scans, which can result in more accurate scan results. Non-credentialed scans by contrast do not rely upon user credential(s) for authentication. More particularly, in one implementation, the credentialed audits may include the active scanners 110 using suitable authentication technologies to log into and obtain local access to the assets 130 in the network 100 and perform any suitable operation that a local user could perform thereon without necessarily requiring a local agent. Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.). On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In one implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic, wherein the reconstructed sessions may then be used in combination with the information obtained with the active scanners 110 to build a model or topology describing the network 100. For example, in one implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In one implementation, the passive scanners 120 may further apply various signatures to the information in the observed traffic to identify vulnerabilities in the network 100 and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In one implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In one implementation, the passive scanners 120 may observe as many sessions in the network 100 as possible to provide optimal visibility into the network 100 and the activity that occurs therein. For example, in one implementation, the passive scanners 120 may be deployed at any suitable location that enables the passive scanners 120 to observe traffic going into and/or out of one or more of the network devices 140. In one implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in one implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
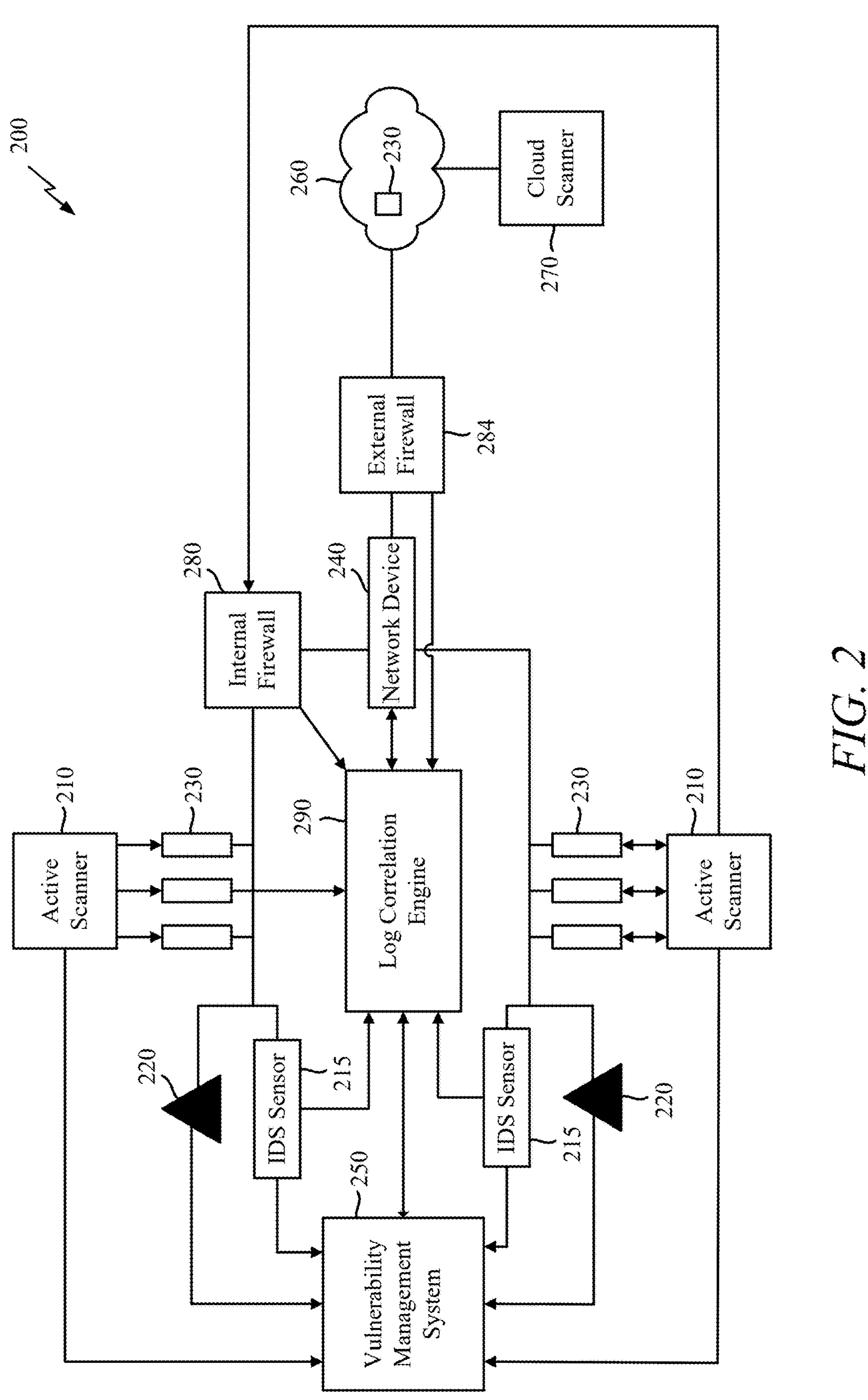
FIG. 2 illustrates another exemplary network having various assets that can be managed using a vulnerability management system, according to various aspects.

According to various aspects, FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in one implementation, the network 200 may include one or more active scanners 210 and/or cloud scanners 270, which may interrogate assets 230 in the network 200 to build a model or topology of the network 200 and identify various vulnerabilities in the network 200, one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in one implementation, a log correlation engine 290 may be arranged to receive logs containing events from various sources distributed across the network 200. For example, in one implementation, the logs received at the log correlation engine 290 may be generated by internal firewalls 280, external firewalls 284, network devices 240, assets 230, operating systems, applications, or any other suitable resource in the network 200. Accordingly, in one implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In one implementation, the active scanners 210 may be strategically distributed in locations across the network 200 to reduce stress on the network 200. For example, the active scanners 210 may be distributed at different locations in the network 200 in order to scan certain portions of the network 200 in parallel, whereby an amount of time to perform the active scans may be reduced. Furthermore, in one implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260, wherein the term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in one implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in one implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In one implementation, in response to obtaining the snapshot of the network 200, the active scanners 210 and/or cloud scanners 270 may then report the information describing the snapshot to the vulnerability management system 250, which may use the information provided by the active scanners 210 to remediate and otherwise manage the vulnerabilities and assets in the network.

Furthermore, in one implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in one implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in one implementation, the passive scanners 220 may be deployed directly within or adjacent to an intrusion detection system sensor 215, which may provide the passive scanners 220 with visibility relating to intrusion events or other security exceptions that the intrusion detection system (IDS) sensor 215 identifies. In one implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In one implementation, the information that the passive scanners 220 obtains from sniffing the traffic traveling across, originating from, or directed to the network 200 may therefore provide a real-time record describing the activity that occurs in the network 200. Accordingly, in one implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In one implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In one implementation, the log correlation engine 290 may normalize the events contained in the various logs received from the sources distributed across the network 200, and in one implementation, may further aggregate the normalized events with information describing the snapshot of the network 200 obtained by the active scanners 210 and/or the network traffic observed by the passive scanners 220. Accordingly, in one implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in one implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or the activity observed by the passive scanners 220 to comprehensively monitor, remediate, and otherwise manage the vulnerabilities and assets in the network 200. Additionally, in one implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

Security auditing applications typically display security issues (such as vulnerabilities, security misconfigurations, weaknesses, etc.) paired with a particular solution for that given issue. Certain security issues may share a given solution, or have solutions which are superseded or otherwise rendered unnecessary by other reported solutions. Embodiments of the disclosure relate to improving an efficiency by which security issues are reported, managed and/or rectified based on solution supersedence.

In accordance with a first embodiment, when working with security reporting datasets with sparse metadata available, the reported solutions for each security issue are combined, and various "rulesets" are applied against the combined solutions to de-duplicate them and remove solutions that have been superseded by other solutions. As used herein, a ruleset is a set of rules that govern when a solution is to be removed or merged with another and how that merge is to be accomplished. In an example, when solution texts not matching a given ruleset are discovered they are flagged for manual review. Examples of rules that may be included in one or more rulesets are as follows:

If there is more than one matching solution in the solution list, remove all but one of those solutions.

For solutions matching "Upgrade to <product> x.y.z" where x, y, and z are integers, select a single result with the highest x.y.z value (comparing against x first, then y, then z).

For solutions matching "Apply fix <fix> to <product>", create a new combined solution where <fix> for each solution is concatenated into a comma separated list for a given <product>.

In accordance with a second embodiment, when working with datasets with metadata available that have an identifier that allows grouping of solutions based on product (e.g., common product enumeration (CPE)) and timestamp information on when a fix has become available, the solutions for each group can be filtered with only display the latest "top level" solution for each group being displayed. In an example, the first and second embodiments can be implemented in conjunction with each other to produce a further refined solution set.

As used herein, a "plug-in" contains logic and metadata for an individual security check in a security auditing application. A plugin may check for one or more mitigations/fixes and flag one or more individual security issues. CPE is a standardized protocol of describing and identifying classes of applications, operating systems, and hardware devices present among an enterprise's computing assets. CPE identifiers contain asset type information (OS/Hardware/Application), vendor, product, and can even contain version information. An example CPE string is "cpe:/o:microsoft:windows_vista:6.0:sp1", where "/o" stands for operating system, Microsoft is the vendor, windows_vista is the product, major version is 6.0, and minor version is SP1. Further, a common vulnerabilities and exposures (CVE) identifier is an identifier from a national database maintained by NIST/Mitre which keeps a list of known vulnerabilities and exposures. An example identifier would be "CVE-2014-6271" which corresponds to the "ShellShock" vulnerability in the database.

In accordance with one implementation of the second embodiment, solutions (or solution 'texts') may first together based on the CPEs in the plugins they were reported in. The solutions are then sorted by the patch publication date from the plugins which they were sourced from. Solutions containing text that matches a pattern that indicates that the solution is likely a patch recommendation can all be removed from the group except the solution associated with the most recent patch. In this manner, patches with identifiers that cannot be easily sorted (e.g., patches with non-numerical identifiers) and/or for which no ruleset pertains in accordance with the first embodiment can be filtered out from the solution set. In some implementations, additional ruleset-based filtering from the first embodiment can also be applied, to filter out (or de-duplicate) additional duplicate solution information.

In accordance with a third embodiment, a security auditing application may evaluate further metadata in the solution report results that is added based upon asset-specific information (e.g., such as individual patches installed, which mitigations and patches are missing, what individual software installations are installed, patch supersedence information, the relationship between the mitigations/patches and security issues, etc.).

Web applications can be an essential way to conduct business. Unfortunately, web applications can also be vulnerable to attacks (e.g., denial of service, disclosure of private information, network infiltration, etc.) due to their exposure to public internet. Thus, addressing vulnerabilities before an attacker can exploit them is a high priority. Web application scanning (WAS) can be performed to identify vulnerabilities associated with web applications. For example, a web application scanner (or simply "scanner") may be used to scan externally accessible website page for vulnerable web applications.

WAS scans may take a relatively long time to perform, and many scans of redundant web pages or substantially redundant web pages may be performed. For example, a newly scanned web page may include only altered content (e.g., text, images, video, etc.) without any functional alterations, making that scan redundant.

When crawling a web application, a large number of web pages are discovered. Hence, deciding which of these web pages to audit via a security audit scan, and which will provide little to no benefit in auditing via the security audit scan, may help to reduce WAS scan times.

Figure 3:
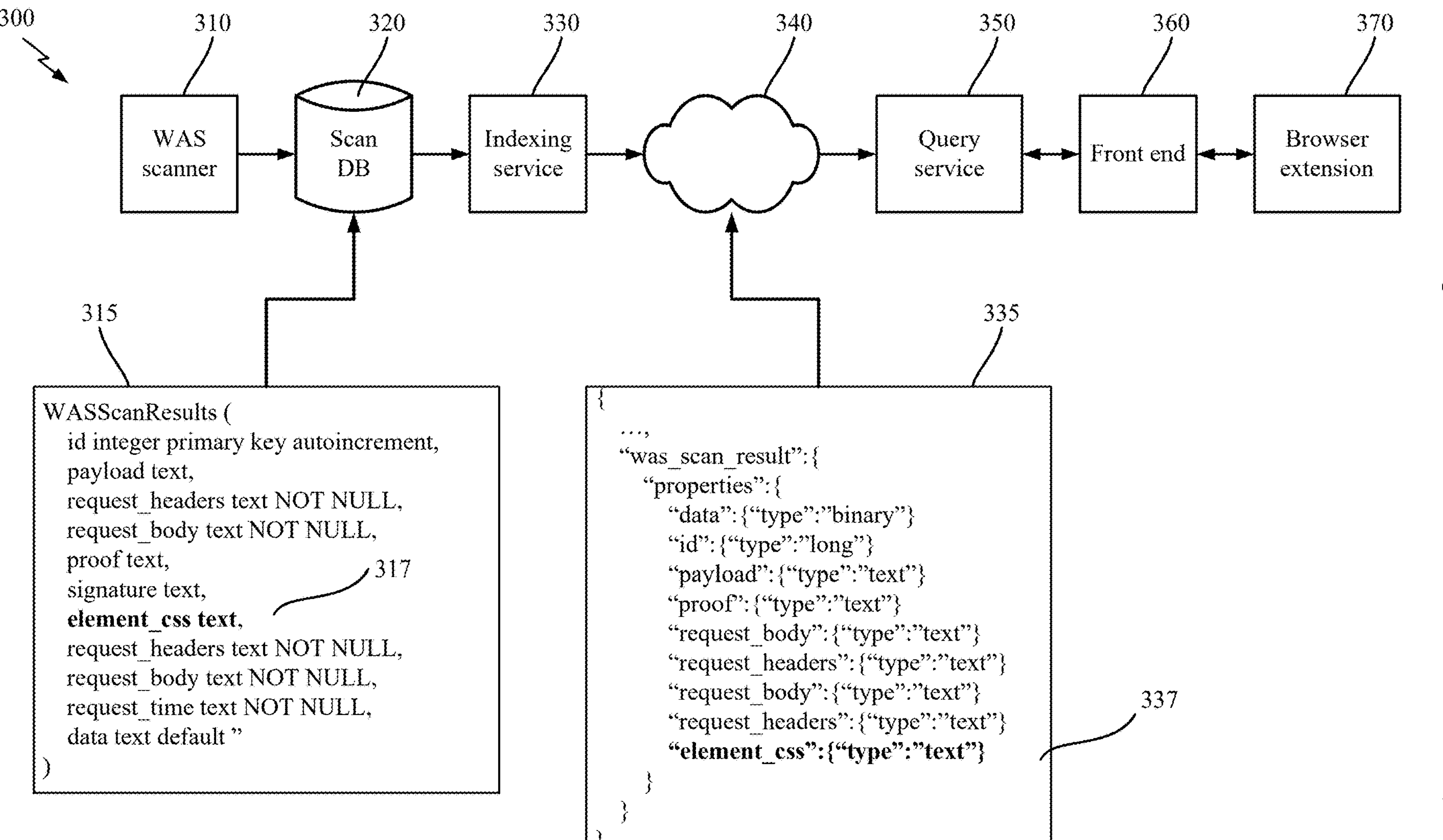
FIG. 3 illustrates a diagram of an example system suitable for interactive remediation of vulnerabilities of web applications based on scanning of web applications.

According to various aspects, FIG. 3 illustrates a diagram of an example system 300 suitable for interactive remediation of vulnerabilities of web applications based on scanning of web applications. In particular, as shown in FIG. 3, the system 300 may include a WAS scanner (or simply "scanner") 310, a scan results 320 (e.g., a database (DB)), a first cloud service 330, a search engine 340, a second cloud service 350, a front end 360, and a browser extension 370. The first and second cloud services 330, 350 may be a same cloud service or different cloud services.

Generally, the scanner 310 may include an element selector for the vulnerable element as a part of its result placed into the scan results 320. Examples (not necessarily exhaustive) of an element selector may include CSS selector, XPath selector, Node number selector, Name selector, Id selector, LinkText selector, and so on. This information may then be passed into the search engine 340 by the first cloud service 330 and included in results from the second cloud service 350 when queried for data about specific vulnerabilities, e.g., from the front end 360. If an element selector exists, the front end 360 (e.g., browser) may include a button that links back to the vulnerable URL and element.

The scanner 310 may be configured to scan web pages to identify one or more vulnerabilities of web applications, i.e., vulnerabilities of elements in web pages. In particular, the scanner 310 may include a selector (not shown) for the vulnerable element in the scan results 320. For example, the selector may implement a scanner function (selector create function) that will take the current element and produce an element selector from it. The URL the element appears on may be included as separate data. A final test may be run before including the data to ensure that the element can be gotten to or otherwise accessible without any extra browser steps that the system is unaware of. Such data may be kept in a table in the scan results 320. For example, FIG. 3 illustrates a VulnerabilitiesDetected table 315, which includes a field for an element selector 317 denoted as "element_css", which is of text type.

The first cloud service 330 may be configured to index the search results within scan results 320. In particular, the first cloud service 330 may be configured to ensure that the field for the element selector 317 is included when the search engine 340 performs a search. In FIG. 3, it is seen the "was_scan_results" 335 data includes the element selector data 337, which is denoted as "element_css":{"type": "text"}.

The second cloud service 350 may be configured to query the search engine 340 for results of WAS scanning, e.g., performed by the scanner 310. In particular, the second cloud service 350 may be configured to query the search engine 340 for the element selector data 337. For example, the second cloud service 350 may submit the following query to pick up the element selector data 337 and return its response, e.g., to the front end 360.

GET/scans/{scanId}/hosts/{hostId}/plugins/{pluginId}

The front end 360 may be configured to receive the WAS scanning results data, including the element selector data for the vulnerable elements. The front end 360 may also be configured to include a button or some other visible element, which when activated (e.g., pressed by a user) will pass message to the browser extension 370 (e.g., chrome extension). The front end 360 may pass at least the following data in the message to the browser extension 370:

URL

Element selector

Plugin ID

The browser extension 370 may be configured to take the message passed from the front end 360, open the URL, and highlight and snap to the vulnerable element. In some aspects, the browser extension 370 may open the URL in a new tab of the browser.

Figure 4:
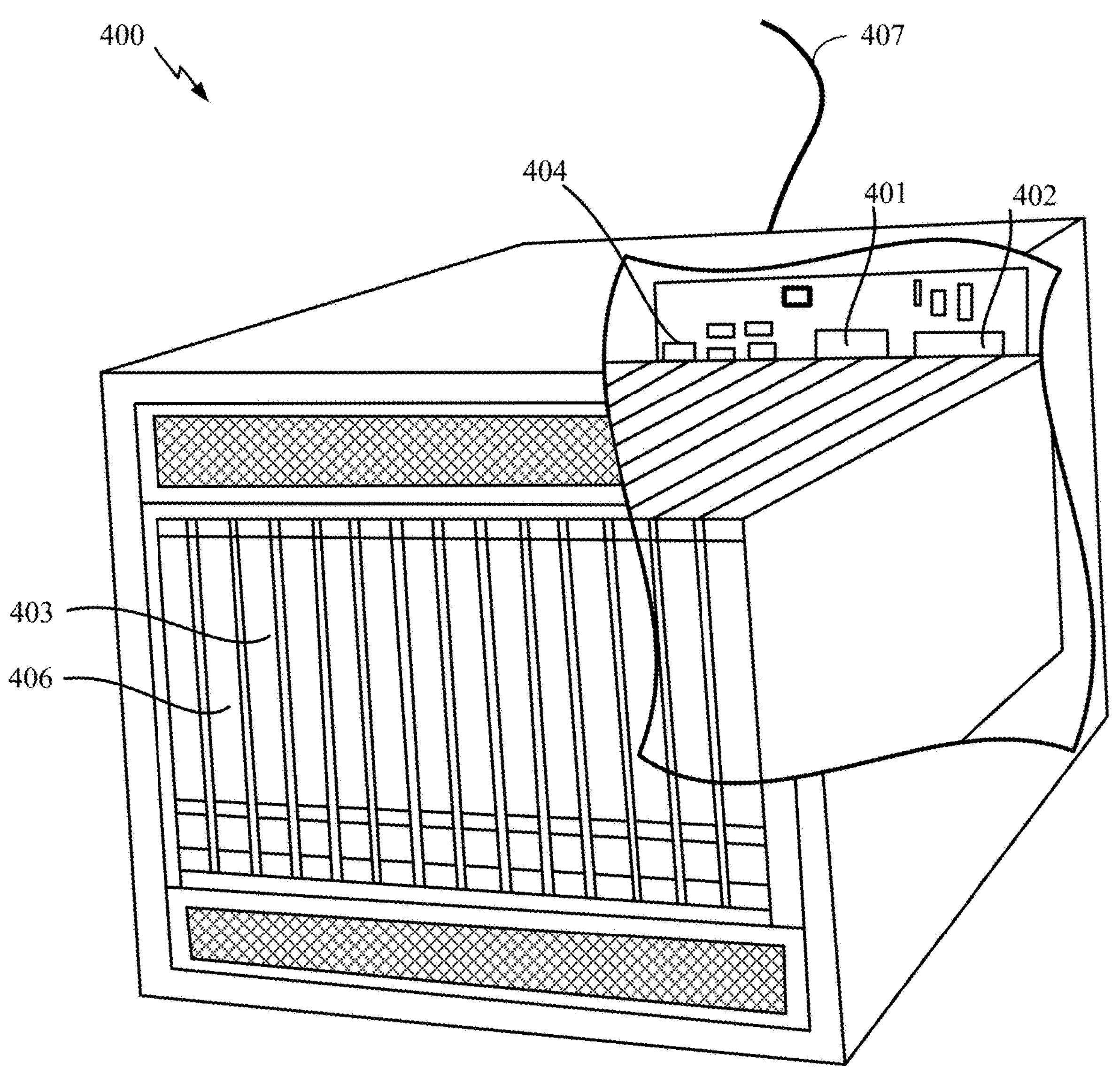
FIG. 4 illustrates a server, according to aspects of the disclosure.

The various embodiments may be implemented on any of a variety of commercially available server devices, such as server 400 illustrated in FIG. 4. In an example, the server 400 may correspond to one example configuration of a server on which a security auditing application may execute, which in certain implementations may be included as part of the vulnerability management system 150 of FIG. 1 or the vulnerability management system 250 of FIG. 2 or WAS scanner 300 of FIG. 3. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet.

While FIG. 4 illustrates an example whereby a server-type apparatus 400 may implement various processes of the disclosure, in other aspects various aspects of the disclosure may execute on a user equipment (UE), such as UE 510 depicted in FIG. 5.

FIG. 5 generally illustrates a UE 510 in accordance with aspects of the disclosure. In some designs, UE 510 may correspond to any UE-type that is capable of executing the process(es) in accordance with aspects of the disclosure, including but not limited to a mobile phone or tablet computer, a laptop computer, a desktop computer, a wearable device (e.g., smart watch, etc.), and so on. The UE 510 depicted in FIG. 5 includes a processing system 512, a memory system 514, and at least one transceiver 516. The UE 510 may optionally include other components 518 (e.g., a graphics card, various communication ports, etc.).

Machine learning may be used to generate models that may be used to facilitate various aspects associated with processing of data. One specific application of machine learning relates to generation of measurement models for processing of reference signals for positioning (e.g., positioning reference signal (PRS)), such as feature extraction, reporting of reference signal measurements (e.g., selecting which extracted features to report), and so on.

Machine learning models are generally categorized as either supervised or unsupervised. A supervised model may further be sub-categorized as either a regression or classification model. Supervised learning involves learning a function that maps an input to an output based on example input-output pairs. For example, given a training dataset with two variables of age (input) and height (output), a supervised learning model could be generated to predict the height of a person based on their age. In regression models, the output is continuous. One example of a regression model is a linear regression, which simply attempts to find a line that best fits the data. Extensions of linear regression include multiple linear regression (e.g., finding a plane of best fit) and polynomial regression (e.g., finding a curve of best fit).

Another example of a machine learning model is a decision tree model. In a decision tree model, a tree structure is defined with a plurality of nodes. Decisions are used to move from a root node at the top of the decision tree to a leaf node at the bottom of the decision tree (i.e., a node with no further child nodes). Generally, a higher number of nodes in the decision tree model is correlated with higher decision accuracy.

Another example of a machine learning model is a decision forest. Random forests are an ensemble learning technique that builds off of decision trees. Random forests involve creating multiple decision trees using bootstrapped datasets of the original data and randomly selecting a subset of variables at each step of the decision tree. The model then selects the mode of all of the predictions of each decision tree. By relying on a "majority wins" model, the risk of error from an individual tree is reduced.

Another example of a machine learning model is a neural network (NN). A neural network is essentially a network of mathematical equations. Neural networks accept one or more input variables, and by going through a network of equations, result in one or more output variables. Put another way, a neural network takes in a vector of inputs and returns a vector of outputs.

Figure 6:
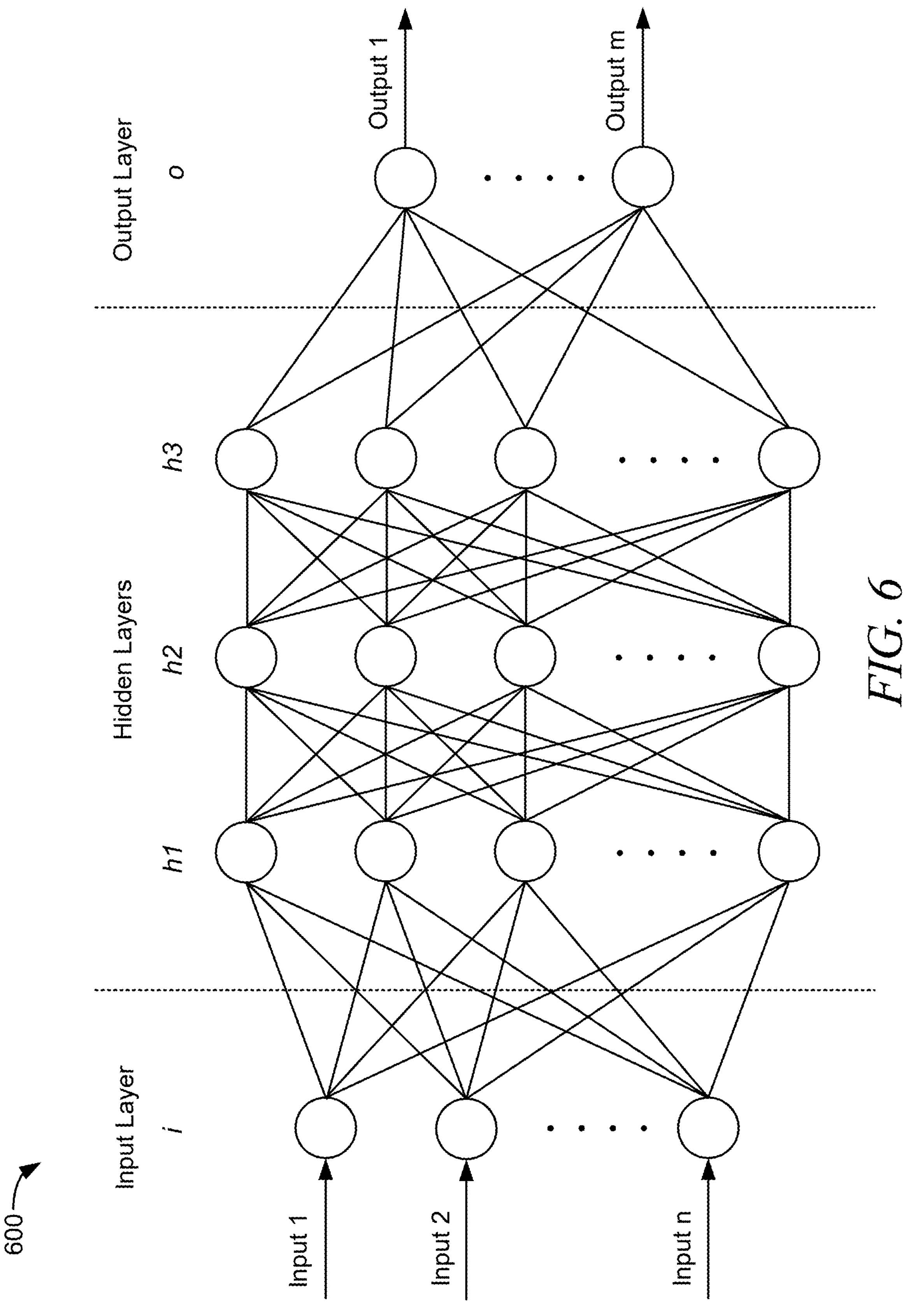
FIG. 6 illustrates an example neural network, according to aspects of the disclosure.

FIG. 6 illustrates an example neural network 600, according to aspects of the disclosure. The neural network 600 includes an input layer 'i' that receives 'n' (one or more) inputs (illustrated as "Input 1," "Input 2," and "Input n"), one or more hidden layers (illustrated as hidden layers 'h1,' 'h2,' and 'h3') for processing the inputs from the input layer, and an output layer 'o' that provides 'm' (one or more) outputs (labeled "Output 1" and "Output m"). The number of inputs 'n,' hidden layers 'h,' and outputs 'm' may be the same or different. In some designs, the hidden layers 'h' may include linear function(s) and/or activation function(s) that the nodes (illustrated as circles) of each successive hidden layer process from the nodes of the previous hidden layer.

In classification models, the output is discrete. One example of a classification model is logistic regression. Logistic regression is similar to linear regression but is used to model the probability of a finite number of outcomes, typically two. In essence, a logistic equation is created in such a way that the output values can only be between '0' and '1.' Another example of a classification model is a support vector machine. For example, for two classes of data, a support vector machine will find a hyperplane or a boundary between the two classes of data that maximizes the margin between the two classes. There are many planes that can separate the two classes, but only one plane can maximize the margin or distance between the classes. Another example of a classification model is Naïve Bayes, which is based on Bayes Theorem. Other examples of classification models include decision tree, random forest, and neural network, similar to the examples described above except that the output is discrete rather than continuous.

Unlike supervised learning, unsupervised learning is used to draw inferences and find patterns from input data without references to labeled outcomes. Two examples of unsupervised learning models include clustering and dimensionality reduction.

Clustering is an unsupervised technique that involves the grouping, or clustering, of data points. Clustering is frequently used for customer segmentation, fraud detection, and document classification. Common clustering techniques include k-means clustering, hierarchical clustering, mean shift clustering, and density-based clustering. Dimensionality reduction is the process of reducing the number of random variables under consideration by obtaining a set of principal variables. In simpler terms, dimensionality reduction is the process of reducing the dimension of a feature set (in even simpler terms, reducing the number of features). Most dimensionality reduction techniques can be categorized as either feature elimination or feature extraction. One example of dimensionality reduction is called principal component analysis (PCA). In the simplest sense, PCA involves project higher dimensional data (e.g., three dimensions) to a smaller space (e.g., two dimensions). This results in a lower dimension of data (e.g., two dimensions instead of three dimensions) while keeping all original variables in the model.

Regardless of which machine learning model is used, at a high-level, a machine learning module (e.g., implemented by a processing system) may be configured to iteratively analyze training input data (e.g., measurements of reference signals to/from various target UEs) and to associate this training input data with an output data set (e.g., a set of possible or likely candidate locations of the various target UEs), thereby enabling later determination of the same output data set when presented with similar input data (e.g., from other target UEs at the same or similar location).

Figure 7:
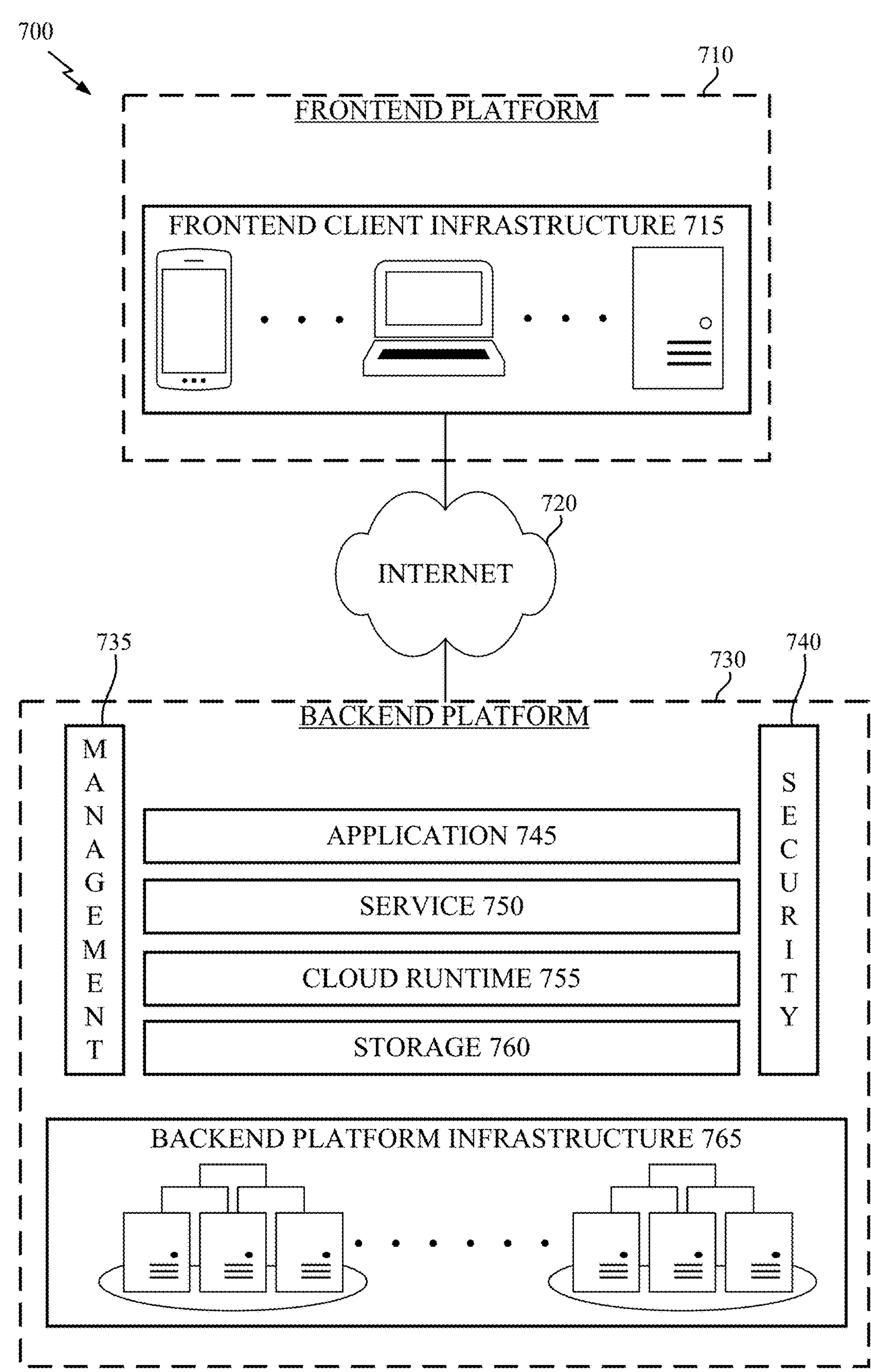
FIG. 7 illustrates cloud network architecture, in accordance with aspects of the disclosure.

FIG. 7 illustrates cloud network architecture 700, in accordance with aspects of the disclosure. The cloud network architecture 700 comprises a frontend platform 710, an Internet 720, and a backend platform 730. The frontend platform 710 comprises frontend client infrastructure 715, such as smartphones, laptop or desktop computers, and so on, for interfacing with clients (e.g., via web browsers, client applications, etc.). The backend platform 730 comprises a management function 735, a security function 740, an application function 745, a service function 750, a cloud runtime function 755, storage 760 and backend platform infrastructure 765 (e.g., a group of distributed and interconnected computing devices with shareable hardware and/or software resources that support distributed implementation of a set of cloud applications via a respective set of cloud resources).

Referring to FIG. 7, in cloud architecture, each of the components works together to create a cloud computing platform that provides users with on-demand access to resources and services. The backend platform 730 contains all the cloud computing resources, services 750, data storage 760, and applications 745 offered by a cloud service provider. A network, such as Internet 720, is used to connect the frontend platform 710 and backend cloud architecture components of the backend platform 730, facilitating data to be sent back and forth between them. When users interact with the frontend platform (or client-side interface), the user devices send queries to the backend platform 730 using middleware where the service model carries out the specific task or request.

The types of services available to use vary depending on the cloud-based delivery model or service model you have chosen. In some designs, there are three main cloud computing service models, e.g.:

Infrastructure as a service (IaaS): This model provides on-demand access to cloud infrastructure, such as servers, storage, and networking. This eliminates the need to procure, manage, and maintain on-premises infrastructure.

Platform as a service (PaaS): This model offers a computing platform with all the underlying infrastructure and software tools needed to develop, run, and manage applications.

Software as a service (SaaS): This model offers cloud-based applications that are delivered and maintained by the service provider, eliminating the need for end users to deploy software locally.

In some designs, cloud architecture may also be characterized in terms of cloud architecture layers, e.g.:

Hardware: The servers, storage, network devices, and other hardware that power the cloud.

Virtualization: An abstraction layer that creates a virtual representation of physical computing and storage resources. This allows multiple applications to use the same resources.

Application and service: This layer coordinates and supports requests from the frontend user interface, offering different services based on the cloud service model, from resource allocation to application development tools to web-based applications.

In some designs, various types of cloud architecture may be implemented, e.g.:

Public cloud architecture uses cloud computing resources and physical infrastructure that is owned and operated by a third-party cloud service provider. Public clouds enable you to scale resources easily without having to invest in your own hardware or software, but use multi-tenant architectures that serve other customers at the same time.

Private cloud architecture refers to a dedicated cloud that is owned and managed by your organization. It is privately hosted on-premises in your own data center, providing more control over resources and more security over data and infrastructure. However, this architecture is considerably more expensive and requires more IT expertise to maintain.

Hybrid cloud architecture uses both public and private cloud architecture to deliver a flexible mix of cloud services. A hybrid cloud allows you to migrate workloads between environments, allowing you to use the services that best suit your business demands and the workload. Hybrid cloud architectures are often the solution of choice for businesses that need control over their data but also want to take advantage of public cloud offerings.

Multicloud architecture uses cloud services from multiple cloud providers. Multicloud environments are gaining popularity for their flexibility and ability to better match use cases to specific offerings, regardless of vendor.

In some designs, components of cloud architecture include:

Virtualization: Clouds are built upon the virtualization of servers, storage, and networks. Virtualized resources are a software-based, or virtual, representation of a physical resource such as servers or storage. This abstraction layer facilitates multiple applications to utilize the same physical resources, thereby increasing the efficiency of servers, storage, and networking throughout the enterprise.

- Infrastructure: loud infrastructure includes all the components of traditional data centers including servers, persistent storage, and networking gear including routers and switches.
- Middleware: As in traditional data centers, these software components such as databases and communications applications enable networked computers, applications, and software to communicate with each other.
- Management: These tools enable continuous monitoring of a cloud environment's performance and capacity. IT teams can track usage, deploy new apps, integrate data, and ensure disaster recovery, all from a single console.
- Automation software: The delivery of critical IT services through automation and pre-defined policies can significantly ease IT workloads, streamline application delivery, and reduce costs. In cloud architecture, automation is used to easily scale up system resources to accommodate a spike in demand for compute power, deploy applications to meet fluctuating market demands, or ensure governance across a cloud environment.

FIG. 8 illustrates a process 800, in accordance with aspects of the disclosure. The process 800 of FIG. 8 may be performed by a component, such as vulnerability management system 150, vulnerability management system 250, server 400 or UE 510.

Referring to FIG. 8, at 810, the component (e.g., network access ports 404, transceiver(s) 516, etc.) generates an identification for a personal account based at least in part on user-asset heuristics, wherein the personal account is heuristically distinguished from an administrative account based at least in part on a number of users associated with an account that is either the personal account or the administrative account.

Referring to FIG. 8, at 820, the component (e.g., processor(s) 401, processing system 512, etc.) determines an owner identity of the owner associated with the personal account by linking the identification with an identity in a data source based at least in part on one or more heuristically determined identity attributes.

Referring to FIG. 8, in some designs, the generating of 810 comprises generating the identification for the personal account based at least in part on a taxonomy of a plurality of classes of devices.

Referring to FIG. 8, in some designs, the generating of 810 further comprises generating the identification for the personal account based at least in part on a taxonomy of a plurality of subclasses of devices within one or more of the classes of devices.

Referring to FIG. 8, in some designs, the classes of devices include a class of personal computing devices (PCDs).

Referring to FIG. 8, in some designs, the class of PCDs includes a subclass of laptop or desktop computers and a subclass of mobile devices.

Referring to FIG. 8, in some designs, the classes of devices further include:

- a class of network infrastructure (NI) devices,
- a class of network infrastructure virtual machines (NIVMs),
- a class of compute and application servers (CASs),
- a class of compute and application servers virtual machines (CASVMs),
- a class of peripheral devices,
- a class of virtual machine or workloads (VMWs),
- a class of cloud devices,
- a class of legacy systems,
- a class of Internet of Things (IoT) devices,
- a class of industrial IoT and operational technology (IIoT-OT),
- a class of telecommunication devices, and
- a class of health care devices (HCDs).

Referring to FIG. 8, in some designs, the generating of 810 comprises generating the identification for the personal account based at least in part on a global asset profile (GAP) of the digital asset.

Referring to FIG. 8, in some designs, the GAP is a function on data associated with the digital asset from the data source.

Referring to FIG. 8, in some designs, the data source comprises Tenable Nessus®, Tenable Nessus® Network Monitor (NNM), Microsoft Active Directory®, Lightweight Directory Access Protocol data source, a locally stored device network configuration, a locally stored user access configuration, or any combination thereof.

Referring to FIG. 8, in some designs, the identity attributes include:

- a name, or
- a username, or
- a title, or
- a position, or
- a manager, or
- an email, or
- a telephone number, or
- a location, or
- a combination thereof.

Referring to FIG. 8, in some designs, the determining of 820 comprises obtaining information associated with a person who has logged on a personal computing device (PCD) locally or has been provisioned access to the PCD locally.

Referring to FIG. 8, in some designs, the user-asset heuristics comprise user-asset graph heuristics.

Referring to FIG. 8, in some designs, the component further performs a vulnerability scan of the digital asset based on the owner identity.

Referring to FIG. 8, in some designs, the digital asset is assigned a class label and one or more subclass labels, wherein the class label comprises a class tag that identifies a type of the digital asset, and the one or more subclass labels comprise one or more subclass tags that identify one or more functionalities of the digital asset.

Referring to FIG. 8, in some designs, the class label and the one or more subclass labels are determined by an unsupervised custom decision tree algorithm.

Referring to FIG. 8, in some designs, determines a confidence value of the owner identity Referring to FIG. 8, in some designs, the confidence value is a global asset profile (GAP) device classification confidence value.

Referring to FIG. 8, in some designs, the component further generates a natural-language description of the digital asset associated with the owner.

Referring to FIG. 8, in some designs, the component further applies an artificial intelligence (AI) or machine learning (ML) model to generate the natural-language description.

Referring to FIG. 8, in some designs, the natural-language description includes a description of the digital asset, one or more functionalities of the digital asset, a class of a device associated with the owner, a subclass of the device, an operating system provisioned, a description of a network configuration of the device, a domain controller, a device class label, one or more device subclass labels, or any combination thereof.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Modern enterprise networks may include a large number (e.g., thousands) of digital assets such as personal computing devices, personal mobile devices, servers with different functionalities, network infrastructure devices, routers and switches, domain controllers, servers, virtual private network (VPN) servers, virtual machines and workloads, smart devices and sensors, cameras, building management systems (BMS), and/or other types of assets. These assets may provide vastly different functionalities and may be administered and owned by different users and/or user groups.

In some scenarios, servers may be installed, uninstalled, repurposed, or decommissioned. Asset functionality may not be static even for a given standalone device, and often may be dynamic and opaque for virtual machines and workloads. Asset ownership is also subject to change during the lifetime of an asset. In corporate environments, for example, users may be on-boarded and leave due to employee turnover. Thus, the digital footprint of various assets is often dynamic and subject to continuous change. For the enterprise network, fundamental questions of digital asset management including the following questions may need to be answered:

(1) What is this asset?

(2) What does the asset do?

(3) Who owns and administers the asset?

(4) Where is the asset located?

In many practical situations, these questions may not be readily answered in real time. Answering these questions with a high-degree of accuracy without manual human intervention may be difficult and expensive. However, answering these questions may be important or even crucial from an asset management perspective, for example, from a security standpoint, a compliance standpoint, and/or a business continuity standpoint.

In some instances, some owners or users of enterprise networks (e.g., corporations) may use large numbers of spreadsheets (e.g., hundreds or thousands of spreadsheets) to perform asset management. Others may use configuration management databases (CMDBs). However, large entities may need to have multiple CMDBs which often may not be synchronized or may have conflicting information regarding digital assets (e.g., personal or mobile devices). Some entities may use information rights management (IRM) solutions or other types of asset management solutions that may require various amounts of human involvement.

In some instances, the question of who owns a digital asset may have multiple interpretations. For example, even the simplest question of identifying the person who uses a given personal computing device (PCD) and thus may be considered the owner of that PCD may not be a simple exercise.

For example, Microsoft Active Directory® (MSFT AD), a widely used network operating system responsible for management of resources such as users, computers, groups, etc., and for authentication, authorization, access control, etc., may provide an "owner" attribute for computer assets. The owner attribute is not a mandatory field and there is no mechanism for automatic maintenance and correctness checks of the values stored in this attribute. Furthermore, it may be difficult to ensure that the "owner" of a digital asset in MSFT AD is associated with a user identity that identifies a real person in MSFT AD. In Linux or MacOS, and many other operating systems, it may be also difficult to associate an "owner" of a digital asset with a real person.

In some instances, it may be relatively easy to provision a system and grant administrative privileges to accounts that belong to employees who later leave the company but their administrative accesses remain provisioned. While the inventory of the installed software may be relatively easy to collect, once collected it does not automatically answer the question of "What does the asset do?"

In some aspects, the question of "Where is the asset located?" may have multiple semantics. For example, it may be interpreted as a network location, a geographic location, a physical location, a business unit owning the asset, a business unit or organization to which the administrators belong to, or a physical location of the owner or administrators of the asset, or another type of location. In some contexts, the owner of an application is considered the owner of the asset.

In some aspects, answering any of the four questions (1)-(4) listed above may require a collection of vastly different data sources. In some aspects, these four questions of cyber asset management may be answered as follows. In some aspects, an asset is referred to as a "host." (For example, in the use case of Nessus® network scanner, an asset can be a host, a virtual machine, or a container.) In some aspects, the terms "asset" and "device" may be used interchangeably.

In some aspects, a class hierarchy may be defined as being extendable and interpretable. In some aspects, each device may be defined as belonging to exactly one class. In some aspects, the class attribute is common among all members of the class, and all devices that belong to a given class share some fundamental similarity.

As defined above, a "class" answers the question of "What is this asset?". In some aspects, devices that belong to a given class may be subdivided into different groups, also referred to herein as "categories" or "subclasses." The subclasses of a given class capture the differences between the devices within the class. A subclass definition (or a category name) answers the question of "What does the asset do?"

In some aspects, while a single device belongs to exactly one class according to the above definition, it is possible (and perhaps common in some situations) for a device to belong to more than one category. For example, an asset classification framework may be defined and a decision algorithm (e.g., a decision tree algorithm) that uses Tenable® data sources, Nessus® plugins, Nessus Network Monitor® (NNM) plugins, and/or MSFT AD data when available, may be implemented to identify, classify, and categorize enterprise assets.

In some aspects, classification taxonomy and decision algorithms may be applied to data collected from endpoint agents, and other third party data sources.

Figure 9:
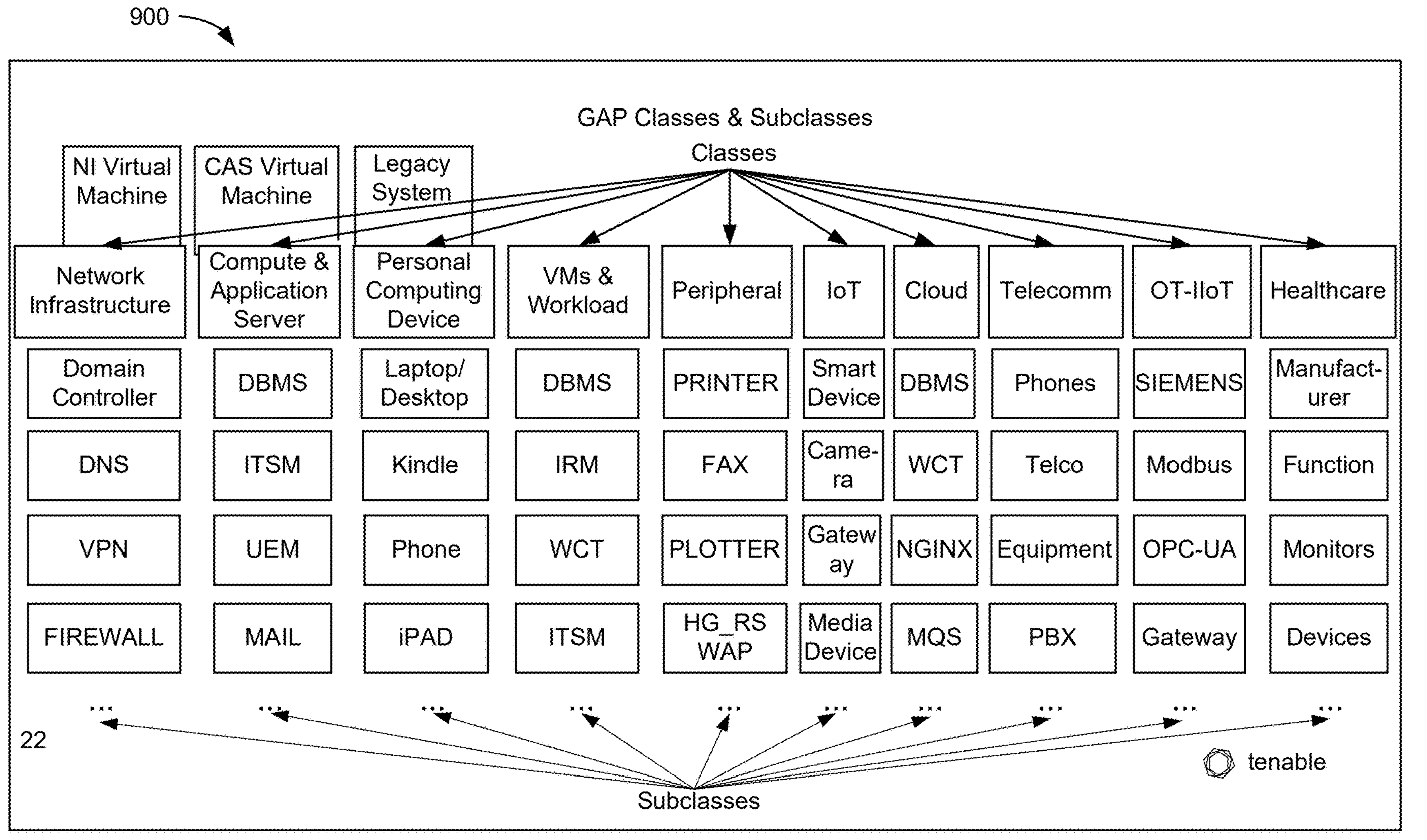
FIG. 9 illustrates an example of classification of global asset profile (GAP) classes and subclasses, according to aspects of the disclosure.

FIG. 9 illustrates an example of a classification of global asset profile (GAP) classes and subclasses 900, according to aspects of the disclosure. In the example illustrated in FIG. 9, classes are shown as blocks in the top row whereas subclasses or categories are shown as blocks in the rows below the top row. For example, classes as shown in FIG. 9 include network infrastructure, compute & application server, personal computing device, virtual machines (VMs) & workload, peripheral, Internet of Things (IoT), cloud, telecom, operational technology-industrial IoT (OT-IoT), and healthcare. The subclasses or categories under the network infrastructure class include device controller, DNS, VPN, and firewall, for example. Each class of devices may include multiple subclasses or categories, as shown in FIG. 9.

In some aspects, even though each subclass or category is shown as a separate box in FIG. 9, once the decision algorithm for classifying and categorizing devices is applied, a single device may be assigned multiple subclasses or categories. For example, data from Nessus®, NNM scanners, and MSFT AD may be used to build a global asset profile. In some aspects, specific attributes may be fed to a custom classification algorithm to determine the class and category of an asset.

To answer the question of "Who owns and administers the asset?", device-specific data and an identity data source may be used. For example, the username may be used to identify who uses the device and/or the privileges associated with the username, and linked with the identity data source to determine whether the corresponding username belongs to a person or not.

As presented above, the question of "Where is the asset located?" may have several semantic interpretations. In some aspects, to answer this question, a small network profile of the asset may be built which contains the following information:

- IPv 4 and IPV6 IP addresses
- IP address assignment type, static or dynamic. IP address assignment type determines if the actual IPv4 and IPV6 addresses extracted from the network interface configuration are relevant or not
- Vendor name of the Mac Address when available In some aspects, in addition to the network address, information may be extracted from the device and the device may be linked with the corresponding MSFT AD record, if the device is configured to join the Microsoft Active Directory domain, for example. Once the device record is linked with the corresponding record from MSFT AD (noting that naive linking with IP address and fully qualified domain name (FQDN) may result in relatively poor fidelity in some instances), the location profile may be augmented with:

- AD Organization Unit (OU), and/or
- AD domain, and/or
- AD forest.

Figure 10:
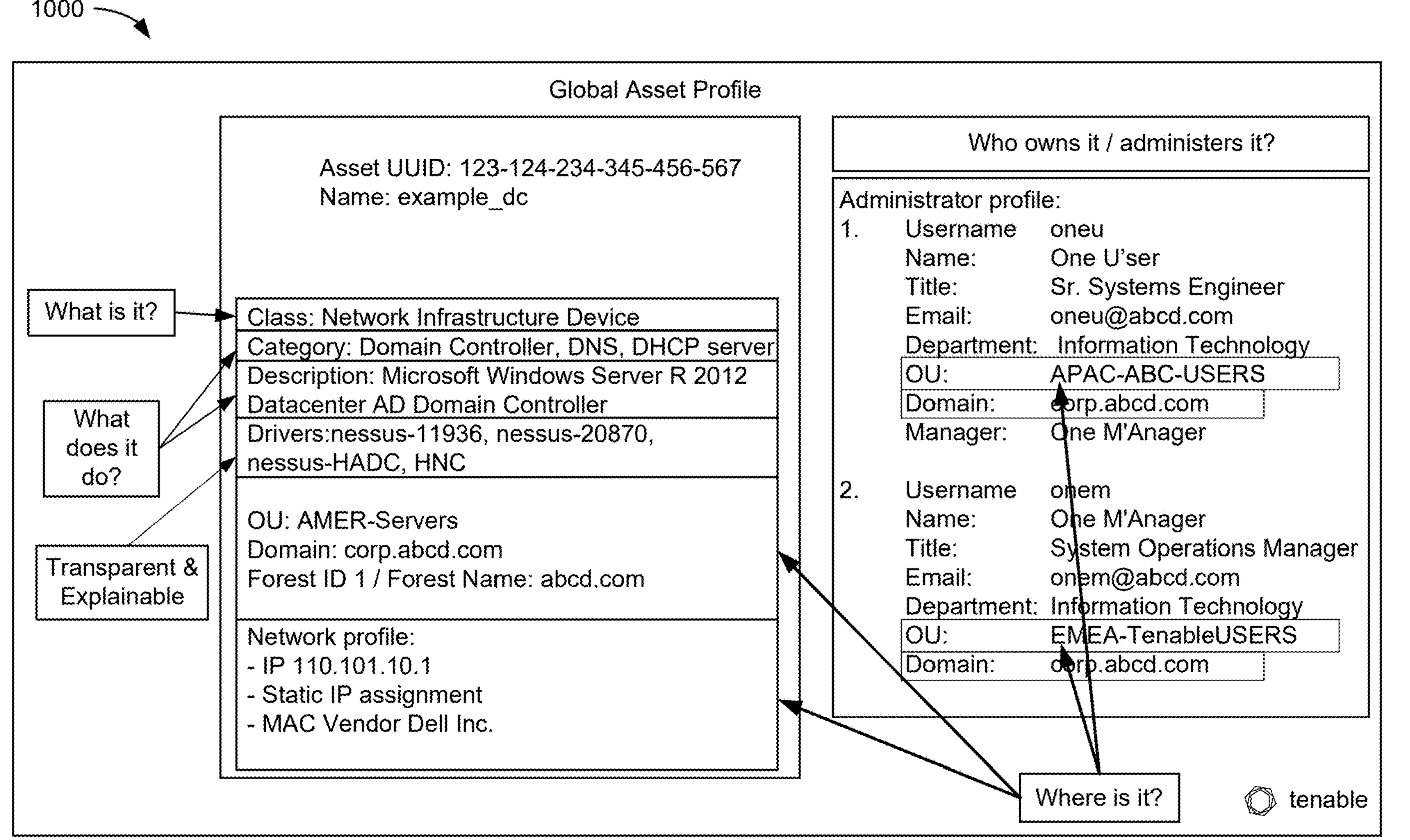
FIG. 10 illustrates an example of a GAP, according to aspects of the disclosure.

FIG. 10 illustrates an example of a GAP 1000, according to aspects of the disclosure. In the example illustrated in FIG. 10, the GAP of an asset is function on data from sources such as Nessus®, NNM, and/or MSFT AD, for example. In some implementations, records in connection with computer objects from Nessus® may be linked with computer objects in MSFT AD, for example. In some implementations, records in connection with usernames may be linked with records in connection with users in MSFT AD to determine the owner and/or administrator, for example, relevant attributes may be extracted from the linkage.

In some aspects, GAP has the following attributes:

- asset class;
- asset category/subclass;
- GAP location described by:
  - organization unit (OU);
  - domain;
  - forest;
  - IP v4 and v6 addresses and assignment type;
  - MAC address; and/or
  - vendor type;
- the owner of the GAP represented by the owner or local administrator's
  - username;
  - title;
  - email and/or phone;
  - department;
  - OU;
  - domain; and/or
  - manager;
- GAP drivers: a short list of plugins or decision points responsible for the class and category assignment.

In some aspects, the classification framework may be explainable, interpretable, and extendable. In some aspects, there are two components to interpretability and explainability. First, the definition of the classes is natural. Second, the users are provided with key decision points used by a classification decision scheme, for example, a decision tree, for assigning the class and the category of each asset.

In some aspects, a class taxonomy may include the following thirteen classes of devices, for example:

- network infrastructure (NI) devices;
- network infrastructure virtual machines (NIVMs);
- compute and application servers (CASs);
- compute and application servers virtual machines (CASVMs);
- personal computing devices (PCDs);
- peripheral devices;
- virtual machine or workloads (VMWs);
- cloud devices;
- legacy systems;
- Internet of Things (IoT) devices;
- industrial IoT and operational technology (IIoT-OT);
- telecommunication devices; and
- health care devices (HCDs).

The above list is an illustrative example of classes of devices. Such a list may be expanded or modified according to aspects of the disclosure. For example, if a new device does not naturally fit into any of the classes listed above, the list of classes may be expanded in a dynamically expandable framework.

In some scenarios, it may be advantageous to divide a class into two or more separate classes. For example, in the class taxonomy example above, IIoT-OT is classified as a single class, which includes both industrial IoT and operational technology (OT) devices. In some implementations, the IIoT-OT class may be separated into two distinct classes, namely, IIOT and OT. In some aspects, the IIoT class may include primarily robotic appliances, whereas the OT class may include traditional operational technology devices, such as programmable logic controllers (PLCs), embedded sensors, etc.

In some aspects, each of the classes in the class taxonomy example above may include multiple subclasses or categories. Examples of subclasses or categories within each of the classes are described below.

Network Infrastructure (NI)

The Network Infrastructure (NI) class includes devices that provide major network service, such as DNS, Dynamic Host Configuration Protocol (DHCP), Authentication & Authorization, load balancing, routing, VPN, etc. If an NI device is down, for example, the unavailability of the service the NI provides is expected to cause network outage with potentially measurable impact on a larger set of users.

Many of the NI devices such as routers, load balancers, hypervisor solutions, etc., are critical from an availability standpoint in the CIA security triad. Other devices, such as firewalls, are actively responsible for executing the security policy of an organization, and devices such as domain controllers are responsible for maintaining identity infrastructure, authentication, and authorization (if MSFT AD is used).

Some NI devices may have specialized HW solutions or run proprietary special purpose operating systems (OS). Other NI devices may use general purpose server grade OS, but have static IP assignment and export critical network services. In some aspects, the NI class may include the following set of subclasses or categories:

- firewalls & next generation firewalls
- load balancers
- network gear (enterprise-grade network switches and routers)
- DNS servers
- DHCP servers
- domain controllers
- VPN servers
- hypervisor solutions and hyperconverged infrastructure platforms
- storage area network solutions
- software defined network solutions
- security service edge devices (zero-trust devices such as Zscaler)
- infrastructure management devices
- time synchronization servers (and/or Lightweight Directory Access Protocol (LDAP) directory services servers)

In some aspects, a device within a given class may belong to multiple subclasses or categories when it provides multiple services. For example, DNS, DHCP, and Network Time Protocol (NTP) (for time synchronization) services may be provided by a single server. In some aspects, the subclass or category of infrastructure management devices may include: KVM switches, integrated access controllers, UPS devices, etc. In some implementations, a subclass may be further divided into multiple (e.g., three) separate subclasses. Additionally or alternatively, the hierarchy of a subclass may be deepened by defining an additional layer, for example, by defining the sub-subclasses of a subclass.

Network Infrastructure Virtual Machines (NIVMs)

In some aspects, the class of Network Infrastructure Virtual Machines (NIVMs) is similar to but strictly distinct from the class of NI devices described above. In some implementations, corporations or organizations may deploy domain controllers, DNS, VPN servers, as virtual machines for flexibility, but also as means to provide relatively inexpensive high-availability solutions.

In some aspects, the NIVM class may contain similar categories as those defined in the NI class. However, a device that provides NI service may belong to the NIVM class when the device is a virtual machine. In some aspects, one of the reasons for having two separate classes, NI and NIVM, is the difference in cost and downtime in reprovisioning a replacement. The cost of deploying a replacement solution when the service is provided in the context of a virtual machine versus purchasing, installing, provisioning, and deploying a standalone (or multi-purpose) server is vastly different in terms of time, money, and/or other resources.

In some aspects, since a device may be detected as a virtual machine (or not), network infrastructure devices may be divided into two separate classes, namely, the NI class (for non-virtual machines) and the NIVM class (for virtual machines). In some aspects, the distinction may be used for various purposes, such as cost, replacement, and/or service restoration estimations. Similar to the NI class, a device that belongs to the CNIVM class may belong to multiple subclasses or categories.

Compute and Application Servers (CASs)

Compute and Application Servers (CASs) are devices that may usually run server-grade operating systems, have statically assigned IP addresses, and provide services to enterprise users. In some aspects, the set of categories in this class may be dense, and the subclass taxonomy for the CAS class is expected to change and to adapt to the type of applications. As an illustrative example, the CAS class may include the following list of subclasses or categories:

- database servers
- version control systems
- repository management
- Wiki & collaboration tools
- network monitoring & management
- MAIL servers
- enterprise asset management platforms
- IT service management platforms
- IT risk management platforms
- unified endpoint management servers
- business Intelligence platforms
- file backup, cashing, replication & data protection servers
- NGINX (load balancer/web server with load balancing capabilities.)
- proxy servers
- security control applications
- aggregators and concentrators
- web servers
- geospatial information systems and mapping servers
- message queue management systems
- container management Compute and Application Servers Virtual Machines (CASVMs)

The class of Compute and Application Servers Virtual Machines (CASVMs) is similar to the CAS class except it includes servers that are running within the context of a virtual machine. In some aspects, since a device may be detected as a VM (or not), two separate classes, namely, the CAS class and the CASVM class, may be provided. Again, a device may belong to only one class but may belong to multiple subclasses or categories within that class. In some aspects, the rationale for dividing CAS and CASVM devices into two separate classes may be the same as or similar to the reason for dividing network infrastructure devices into NI and CNIVM classes, namely, for distinguishing the cost of redeployment, service downtime estimation, and/or other effects.

Personal Computing Devices (PCDs)

In some aspects, devices classified as personal computing devices (PCDs) are vastly different from CNI, CNIVM, CAS, CASVM classes. PCDs are expected to be used by a single user. In some implementations, PCDs may run operating systems that are not server-grade OS, for example, Windows 7, 8, 10, 11, MacOS, etc., and may be usually provisioned dynamic IP addresses.

As an illustrative example, the PCD class may include the following subclasses or categories:

- laptops & desktops
- mobile phones
- iPads
- Kindles
- Tablets
- stateless end point devices
- virtual machines Unlike the previous classes, namely, the CNI, CNIVM, CAS, and CASVM classes, a PCD may belong to exactly one subclass or category.

Peripheral Devices

As an illustrative example, the class of peripheral devices may include the following subclasses or categories:

- printer
- fax
- plotter
- home-grade network switches & routers
- wireless access points In some aspects, peripheral devices may be detected because they include specialized hardware components that may require specialized operating systems which indicate the device and its category, or use a specific network protocol indicating its functionality. In some aspects, like the PCD class, a device in peripheral device class is expected to belong to exactly one subclass or category due to its specialization. In some aspects, the class of peripheral devices may be expanded as other specialized devices are deployed in various enterprise settings.

Virtual Machines & Workloads (VMWs)

In some aspects, the class of Virtual Machines & Workloads (VMWs) include virtual machines of ephemeral type, which are distinct from devices that belong to the CNIVM and CASVM classes. In some aspects, VMWs may run a variety of operating systems and applications. Unlike CASVM devices, ephemeral virtual machines and workloads are not restricted to server-grade operating systems, but if they do run on server-grade operating systems, then they usually may have dynamic IP address assignments.

In some aspects, the subclasses or categories of the devices in the VMW class depend on the software installed and detected on the device or the services exported by the device. Thus, it may be possible to see devices with subclasses or categories under the VMW class similar to the CAS class, but they are distinct due to their ephemeral nature.

Internet of Things (IoT)

In some aspects, the class of Internet of Things (IoT) devices may include the following subclasses or categories:

- cameras, surveillance equipment, and physical security devices
- media devices
- smart devices & sensors
- IoT gateway and bridge devices
- Point of sale devices In some aspects, the IoT class may include devices with well-defined functions which are self-explanatory from the names of subclasses or categories. The IoT class may include a variety of consumer-grade IoT devices. For example, the subclass or category of media devices may include projectors, encoders, decoders, presentation devices, sound equipment, video, smart TV devices, etc. The subclass or category of smart devices and sensors may include smart hubs, bulbs, plugs, sockets, doors, etc.

In some aspects, the subclass or category of IoT gateway and bridge devices may be used to control and manage IoT devices that usually use low-power or non-IP protocols, such as IEEE 802.15.4-based protocols. In some aspects, IoT gateway and bridge devices may run management applications that are controlled over HTTP.

To detect these IoT devices, a large list of operating systems may be provided which are typically used to control these special purpose hardware devices, but may also leverage NNM or Nessus® plugins for detection, for example. The IoT gateway and bridge device category may include potential general purpose devices that run an IoT management server which controls IoT devices that use non-TCP/IP protocols, such as Zigbee or other types of non-TCP/IP protocols.

In some aspects, any of the subclasses or categories of the IoT class may be further extended, refined, or split for greater granularity. For example, the subclass or category of cameras, surveillance equipment & physical security devices may be split into three separate categories: (1) cameras; (2) surveillance equipment; and (3) physical security devices. As another example, the subclass or category of smart devices & sensors may be expanded based on growth of vendors and functionalities.

Industrial Internet of Things and Operational Technology Devices (IIoT-OT)

In some aspects, the class of IIoT-OT devices groups together roboticized devices, OT sensors, OT gateways and bridges that appear in IT networks. In some aspects, the IIoT-OT class may include:

- building management systems (BMS)
- OT gateway
- real-time operating system & embedded operating system (RTOS-EOS) devices
- embedded devices (ED)
- serial device
- programmable logic controller
- relay
- graphics terminal device
- OPC-UA device
- DNP3 device
- Crimson device
- Siemens S7 device
- Omron FINS device
- Moxa/Modbus device
- Panasonic control
- Siemens CP 443
- Trimble device In some aspects, BMS devices may include HVAC systems, building adapters (e.g., Honeywell building adapters), etc. In some aspects, the primary OT-specific protocol that distinguishes this group from other devices is the Bacnet protocol (Building Automation and Control), encapsulated in TCP/IP.

In some aspects, the OT gateway subclass or category, similar to the IoT gateway subclass or category of the IoT class, may include general purpose devices that monitor and control OT devices. In some aspects, the serial device subclass or category may include serial-Ethernet protocol adapters. In some aspects, devices belonging to the remaining subclasses on the above list may identify OT devices based on the type of the OT-specific protocol that they are observed to communicate with. In some implementations, the type of OT-specific protocol may be detected with NNM or Nessus® plugins, for example.

Legacy Systems

The class of legacy systems may include computing devices running general-purpose operating systems that have reached their end-of-support. These legacy systems may appear in many IT deployments even though they are out of date, as they can still connect and control proprietary hardware devices, embedded devices, OT devices, etc.

In some aspects, the legacy class may include the following categories or subclasses:

- Windows 3.1
- Windows 95
- Windows 98
- Windows XP
- Windows NP

Windows Me
Windows 2000
Windows Vista
Windows 2003
Windows 2008
Windows 2011
Windows 2012

In some implementations, from a security standpoint, it may be desirable to group these devices into a separate class because the security controls available to harden their posture may be limited and often require isolation with additional network controls.

HEALTH CARE DEVICES (HCDs)

In some aspects, the class of healthcare devices may include, for example, medical devices such as blood pressure monitors, MRI devices, etc. In some aspects, these devices may be recognized because they run proprietary operating systems.

Telecommunication Devices (Telecomm)

In some aspects, the class of telecommunication devices may include the following subclasses or categories:

phones (e.g., VOIP, SIP Phones, IP phones)
transmission equipment
PBX servers
video conferencing equipment
VoIP gateway adapters
Antennas or distributed antenna arrays In some aspects, these devices may be recognized by detecting the operating systems that control such devices.

In some aspects, the question of "Who owns/administers the asset?" may be answered by leveraging the ability of Nessus® to list users that are provisioned local access of the device from the device itself. In some aspects, the user account data obtained from the device data may be correlated with data from an identity source, such as an LDAP server.

For example, MSFT AD is one of many proprietary solutions implementing X.500-based hierarchical structure of containers and objects, and there are many other LDAP implementations that include open source software. In some aspects, it may be heuristically determined whether the LDAP user identity belongs to a person or not, and the user/administrator of the device may then be determined.

In some aspects, the question of "Where is the asset located?" may be answered by pulling information from the network interface. For example, if the device has a statically or dynamically assigned IP address, the Nessus® and MSFT AD data sources may be linked reliably. The OU attribute from the LDAP (or MSFT AD) may be associated with the linked computer object. In some implementations, OUs are one of the well-known containers of MSFT AD because the architecture and structure of the OUs may reflect the actual business structure of the organization.

In some aspects, a technical advantage of the disclosed systems and methods may include improved granularity over existing asset management systems by providing highly detailed asset classification and categorization using GAP, which provides users with greater insight into their environment and support highly sophisticated asset management strategies.

In some aspects, another technical advantage of the disclosed systems and methods may include improved breadth over existing asset management systems, as the GAP framework covers a wider variety of systems achieved by leveraging data across multiple data sources, including, for example, Nessus®, NNM, and MSFT AD.

In some aspects, another technical advantage of the disclosed systems and methods may include extensibility which allows the current classes and subclasses/categories of devices to be extended easily to incorporate new classes and subclasses/categories of devices. In some aspects, the classes and subclasses/categories may be extended to leverage external data and third-party data sources such as endpoint agents.

In some aspects, another technical advantage of the disclosed systems and methods may include interpretability which allows transparency in how asset classification and categorization are derived.

In some aspects, another technical advantage of the disclosed systems and methods may include vulnerability remediation. In some scenarios, the problem of identifying who is responsible for vulnerability management on each device may be complex and often organization dependent. In some implementations, identifying the person who owns the device and the person who administers the device may be an important component of vulnerability remediation, which may be provided by the systems and methods according to aspects of the disclosure.

In some aspects, another technical advantage of the disclosed systems and methods may include highlighting of "shadow risk." For example, in some scenarios, organizations may not know what digital assets are present on their networks. For example, IoT devices, bring-your-own device (BOYD), and mobile devices may be difficult to track, monitor, and record in the organization's inventories.

As another example, within an organization there may be orphaned accounts which were granted access but should have been terminated. By discovering the owners or administrators of devices with orphaned accounts, devices associated with orphaned accounts for persons who have left the organization may be denied access to the organization's network. As another example, by identifying the owners of unapproved devices, devices that are not registered with identity infrastructure or not enrolled in endpoint security and management may be prevented from accessing the organization's network.

In some aspects, another technical advantage of the disclosed systems and methods may include improved physical security of the organization. For example, classifying, categorizing, and tracking security devices such as IoT cameras and surveillance equipment may help ensure that these devices are properly installed, patched, and accounted for.

In some aspects, data collected from Nessus® plugins, NNM plugins, identity data sources such as MSFT AD or another LDAP server containing information about computers (e.g., hosts) and users may be used for digital asset classification and categorization. In some aspects, the workflow for classification and categorization may including the following:

I. Data collected from Nessus and NNM INFO plugins is used to build a global asset profile. (The data collection is assumed to have been completed.)
II. Nessus® data about a host is linked with the corresponding record containing data about the same host from MSFT AD or another LDAP server.
III. A classification algorithm is implemented to classify and categorize assets. In some implementations, the classification algorithm may use data collected from Steps I and II. In some implementations, one or more decisions and/or data points of the algorithm may be presented to the users to ensure explainability and transparency of the classification and categorization process.

IV. Local device-specific data about user accounts provisioned on the device (e.g., collected by Nessus® plugins) may be used in conjunction with information about user account privileges or accesses granted to the account. The user accounts of owners and administrators may be linked with the corresponding records in MSFT AD (or another LDAP source of equivalent information) to heuristically determine the person who is the primary user or owner of a PCD.

Ownership identification of digital assets may be performed in various manners according to aspects of the disclosure. Some or all of the above-listed steps may be modified, altered, expanded, or omitted, and need not be performed in a particular order.

Step I:

In some aspects, the data collected in Step I above may fall in one or more of the following categories:

1. Device hardware/firmware—
   For example, Nessus® may detect that the device is running Cisco Meraki MS320-24P Firmware, and this indicates that device is a Cisco Meraki router (because this firmware is used only by these devices).
2. Device operating system name, confidence level, method—
   For example, a decision tree may use the operating system attribute when the confidence level for the retrieved value is above 95%. The operating system that the device uses may be retrieved from a remote or local Nessus® scan.
3. Host network configuration—
   For example, for each network interface, excluding the loopback, IP addresses and IP address assignment type may be used (e.g., static/dynamic IP address assignment using Nessus® plugin).

4. MAC address vendor string—
   For example, MAC address may be relevant for some OT devices and routers.
5. Host Active Directory configuration—
   For example, any host that joins MSFT AD domain stores local information when allowed to do so. Local AD attributes may be retrieved by linking Nessus® and MSFT AD data (e.g., using Nessus® plugin).
6. Microsoft DomainRole value, if available—
   For example, this attribute may be stored locally on Windows hosts only. However, information about the role of an asset may be obtained after linking the records and considering MSFT AD Primary Group ID, for example.

In some aspects, for each class and subclass, different host attributes may be necessary (although may not be sufficient) to classify a device and to identify the category or the set of categories to which it belongs. For example, if a device is running "F5 Networks BIG-IP" operating systems, then it may be sufficient to decide that the device is a F5 Networks BIG-IP load balancer. However, if a device is running a DNS server on Port 53, for example, then that information alone is not sufficient to classify the device as an NI DNS server. As illustrative examples, the documents listed below may identify specific data necessary for the classification of each class and each subclass (or category). These documents may also define a classification taxonomy for operating systems, applications, and network protocols. For example, there are 323 classified operating systems that are associated with special purpose devices, general purpose servers, legacy systems, and personal computing devices.

For example, Microsoft Windows Server and Red Hand Linux are examples of general purpose server-grade operating systems, whereas MacOS, Microsoft Windows 7, 8, 10, and 11 are examples of a general purpose PCD operating system. Microsoft Windows 3.0, 3.1, 95, 98, etc. may be classified as legacy operating systems, and Windows CE may be classified as an embedded operating system.

Step II:

In some aspects, data source linking may be performed by linking Nessus® data about the host with the corresponding record in MSFT AD record, for example, to build a global asset profile (GAP) of an asset. On *nix and MacOS devices, attributes such as Forest ID, Forest Fully Qualified Domain name (FQDN), Domain, DNSname, and sAMAccountName attributes may be obtained locally from the device and used for linking without a query to a domain controller. On Windows devices, attributes such as DistinguishedName may be used to heuristically link Nessus® data about a device with the corresponding record in MSFT AD with a relatively high degree of confidence.

In some aspects, after linking Nessus® with MSFT AD for all computing devices, the following information may be obtained:

AD Organization Unit-attribute natively defined by each AD administrator that may potentially reveal the theater, country, business unit, etc., to which the asset belongs.

AD Primary Group ID (PGID) of the device—a useful attribute (among many others) to detect a domain controller and ReadOnly domain controllers.

Step III:

In some aspects, asset classification algorithm such as a classification tree algorithm is implemented for classification of classes and categorization of subclasses in the examples described above.

In some aspects, for NI and NIVM classifications:

A device belongs to NI or NIVM if

1. It is a specialized HW or runs a proprietary OS for one of the categories
2. OR
   Runs general purpose server-grade operating system AND
   Has a static IP address assignment AND
   One or more services that indicate NI categories.
3. If virtual machine is detected (Nessus plugins can detect VM)

```
then class = NIVM
else class = NI
```

The subclass (or category) of the device may be determined by classification of the hardware or operating system or services running on that device.

For domain controllers, the following logic may be used:

Runs server grade operating system listed in document AND

Has a static IP address assignment AND

One or more of the following conditions are TRUE:

- LDAP server is detected
- DomainRole={PrimaryDomainController or BackupDomainController}
- PGID=516 or PGID=521

AND has NTP server running (DCs are time synchronized)

AND has DNS server running

In some aspects, for CAS and CASVM classifications:

A device belongs to CAS or CASVM if

1. Runs general purpose server-grade operating system
2. Has a static IP address assignment AND
3. Runs one or more applications that indicate one or more CAS categories.
4. If virtual machine is detected (Nessus plugins can detect VM)

| |
|---|
| then class = CASVM |
| else class = CAS |

In some implementations, if a device runs multiple applications, for example, a Tableau Server (BIP=Business Intelligence Platform) and Oracle Server (Database), then the subclass assignment for the device is [BIP; DATABASE].

In some aspects, for PCD classification (Virtual Machine & Workload):

Personal mobile devices such as iPads, Kindles, mobile phones, etc. may be detected with NNM plugins. For example, a mobile device have class=PCD and subclass=Mobile Devices.

Laptops and desktops may be detected as follows:

1. If a device runs a general purpose PCD-type operating system AND
2. If IP address is statically assigned=>Class=Workload (VM&W)
3. If IP address is dynamically assigned
   i. then
   ii. If Virtual Machine IS NOT detected

| | |
|---|---|
| then | class = PCD; subclass=Laptop__Desktop |
| else | class = Virtual Machine Workload; subclass=OS name |

In the above example, Condition 3 checks if the OS runs in the context of a virtual machine and if so then the appliance is classified as a virtual machine workload.

In some aspects, for VMW classification:

1. Type 1:
   a. Devices running general purpose server-grade operating system AND
   b. dynamically assigned IP are considered workloads
2. Type 2:
   a. Devices running general purpose PCD-type operating system
   b. AND statically assigned IP address are considered workloads
3. Type 3:
   a. Virtual Machine is Detected (see [9])
   b. AND device is NOT NIVM
   c. AND device is NOT CASVM The subclass of a VMW device may be determined by the category of the application(s) running on that device.

In some aspects, for legacy system classification:

Microsoft Windows 3.0, 3.1, 95, 98, NT, XP, Me, 2000, Vista, etc. are general purpose machines that belong to the class of legacy systems. They may be placed in a separate class as they are often used in OT or IIOT settings to control legacy hardware. These systems may be isolated from other systems because they have passed end-of-life support. In some implementations, other security policy decisions may need to be provisioned to secure the legacy systems (e.g., behind firewalls, DMZs, etc.).

In some aspects, for cloud device and container classifications:

The class of a device is cloud if

1. Cloud devices and containers are hosted usually on special images (see [10])

2, or can be classified by the data source (CS)

The subclass of the device may be determined by the category of the application(s) running on that device.

In some aspects, for peripheral, IoT, IIoT-OT, telecommunications device, and healthcare device classifications:

These devices may be classified based on the operating systems that they run or the type of hardware detected. The operating systems and/or the type of hardware may be detected using Nessus® or NNM plugins, for example.

Step IV:

In some aspects, the identification of owner or administrator may be platform dependent and data dependent. The following are two examples (Step IV.A and Step IV.B) of identification of the owner or administrator of a digital asset. Owner or administrator identification may be performed in various manners according to aspects of the disclosure.

Step IV.A: Owners of PCD-MacOS

Graph-based heuristics may be used to determine the owner of devices classified as PCD and subclass equal to LAPTOP_DESKTOP. The graph structure may be built separately for each operating platform. In some aspects, the goal is to distinguish system administrator accounts used by the administrators to administer and/or install the devices from a personal user account that is the primary user who might or might not have admin privileges.

On each device, user accounts (or usernames) may be extracted, and groups to which the user accounts (or usernames) belong to may be determined. On MacOS and Linux, accounts in the Systems section may be discarded.

In some aspects, a graph-based user account owner identification for PCDs may be built.

FIG. 11 illustrates a user-asset graph 1100, according to aspects of the disclosure. The user-asset graph 1100 may be used for determining user accounts that belong to persons who are primary users of PCD and IT administrator accounts. In some aspects, it is expected that a personal account may typically have a low degree (i.e., a relatively small number of hosts associated with that personal account, e.g., three or fewer). On the other hand, IT administrative accounts may have relatively large degrees as they usually are provisioned on a large number of PCDs within a given platform.

In the example illustrated in FIG. 11, the IT administrative account (e.g., oneu) may be associated with multiple devices or hosts (e.g., Host 1, Host 2, . . . Host N), whereas each of the users may be associated with one device or host. In the example shown in FIG. 11, a first user (user1) is associated with one device or host (Host 2), a second user (user2) is associated with another device or host (Host 4), a third user (user3) is associated with another device or host (Host 3), and another user (userK) is associated with yet another device or host (Host N). Thus, user is identified as the owner of Host 2, user2 is identified as the owner of Host 4, user3 is identified as the owner of Host 3, and userK is identified as the owner of Host N.

In some aspects, for each user account, the degree, which is the number of hosts on which the user is provisioned local administrative access, may be determined. In the example illustrated in FIG. 11 and described above, an IT administrative account (e.g., the account with "oneu" username on), may have a degree proportional to the number of hosts, whereas an ordinary user account may have relatively low degree (e.g., usually below 5).

In some aspects, once the username of the owner is determined, identifying the person associated with the account may be accomplished by linking the username with an identity in MSFT AD (or a similar identity source). In some aspects, a heuristic determination may be made as to whether an identity is associated with a person based on identity attributes. In some aspects, when the identity source is not present, user accounts that are likely owners may still be identified, and accounts that are used by system administrators may be separated from the accounts used by likely owners to control the PCDs.

In some aspects, similar logic may be applied to devices that run Windows operating systems, except that information may be obtained as to who has logged on that device locally. In some implementations, system administrators may use remote desktop logins. In some implementations, on Windows systems that join MSFT AD by default, the entire user container may login onto any system. Thus, the account owner may be identified by determining who has logged onto the PCD locally.

Step IV.B Administrators on *nix Systems

Whereas PCDs may have owners, servers may have one or more administrators. In some aspects, usernames that can log onto the device may be identified (start script is a proper shell, exclude nologin; exclude systems accounts). In some aspects, group(s) to which the usernames belong may be identified, and a determination may be made as to whether the groups are associated with administrative privileges (e.g., wheel, root, admin, etc.). Then, usernames may be linked with sAMAccountNames in MSFT AD and the "is person" heuristic is applied to the corresponding MSFT AD record.

In some aspects, an asset classification framework, an example of which is illustrated in FIG. 9 and described above, includes a set of thirteen (13) classes (13) and eighty-five (85) subclasses. In some aspects, a decision tree algorithm for asset classification may be provided which takes device data such as network interface configuration, vendor MAC address, operating system, protocols that the device uses, applications and processes that are running (or installed) on the device to classify each digital asset by assigning, to each device, a class and one or more subclasses (or categories) according to asset classification taxonomy.

In the examples described above, owners of digital assets are identified based on asset classification taxonomy by using Nessus® data, NNM data, and MSFT AD data. In other implementations, however, the data sources are not limited to or dependent on Nessus®, NNM, and/or MSFT AD. For example, any EndPointDetection agent may report the network configuration of a device (which may include the IP address, assignment type, MAC address, etc.), the operating system, the application(s) installed and running on the device, and/or the open ports on the device.

In some aspects, the list of processes running on a device may be trivially listed with standard commands on various operating systems (e.g. ps-aef, on Unix variants). In some aspects, the list of installed software packages on a device may be used as a surrogate for the list of processes running and may also be trivially obtained on various systems.

In some aspects, data obtained by NNM may be passively collected by simply collecting NetFlow Data from routers or other traffic aggregators, (e.g., network detection and response (NDR) systems).

In some aspects, various alternative data sources relevant to cloud devices may provide equivalent data as the information that can be reported by endpoint detection and response (EDR), Nessus®, NNM, or the like. For example, information that may be reported by alternative data sources may include but is not limited to operating system, network configuration, software installed, software running on the device, security groups, firewalls enabled, etc. In some aspects, Docker containers and OS images may be scanned in an alternative manner while not running to retrieve the installed packages.

In some aspects, in case where only data obtained locally from a device about provisioned accounts (e.g., /etc/passwd on Unix systems) is available, a graph-based algorithm may be used to determine the username that has administrative privileges and is the owner of a PCD. When information from MSFT AD is present, the username may be linked with the identity by identifying an owner of an asset or a set of administrators who are persons of a given server device. In some aspects, a heuristic determination may be made as to whether an identity in MSFT AD is associated with a person based on attributes of an identity in MSFT AD. Alternatively or additionally, other identity sources or LDAP implementations may be used for determining owner identity.

In some aspects, a natural language (e.g., English language) description of each asset may be used to improve the interpretability and usability of asset classification. In some implementations, interpretability may be an important factor for customers to understand why a device is assigned a class and one or more subclasses (or categories). To deliver interpretability and to improve usability, decision points (or drivers) may be recorded. As used herein, a "driver" is a record of the path from the root of the tree until the classification is complete.

In some aspects, metadata about each decision point may be used. For example, the metadata may include the operating system and the value of the decision point (e.g., Microsoft Windows Server Datacenter 2022). In some implementations, a list of plugin IDs may be recorded as drivers.

In some aspects, a generative artificial intelligence (GenAI) foundational model with properly engineered prompts may be applied to deliver natural language (e.g., English language) description and justification for the actions of the classifier. In some aspects, a natural language description using the GenAI model may provide an added benefit to interpretability, since the GenAI model is known to be feasible for providing a relatively short natural language summary.

In some aspects, providing a natural language summary may save customers time and effort while looking up drivers, thus resulting in improved interpretability. In some implementations, a generalized or comprehensive natural language description may be provided to deliver explainability of short decision trees, long decision trees, and/or an ensemble of decision trees.

FIG. 12 illustrates an example of English-language description 1200 of an asset and justification of class/subclass assignment, according to aspects of the disclosure. In the example illustrated in FIG. 12, the description under "English language description of an asset" was generated by using the VertexAI (text-bison-001) GenAI model.

Figure 13:
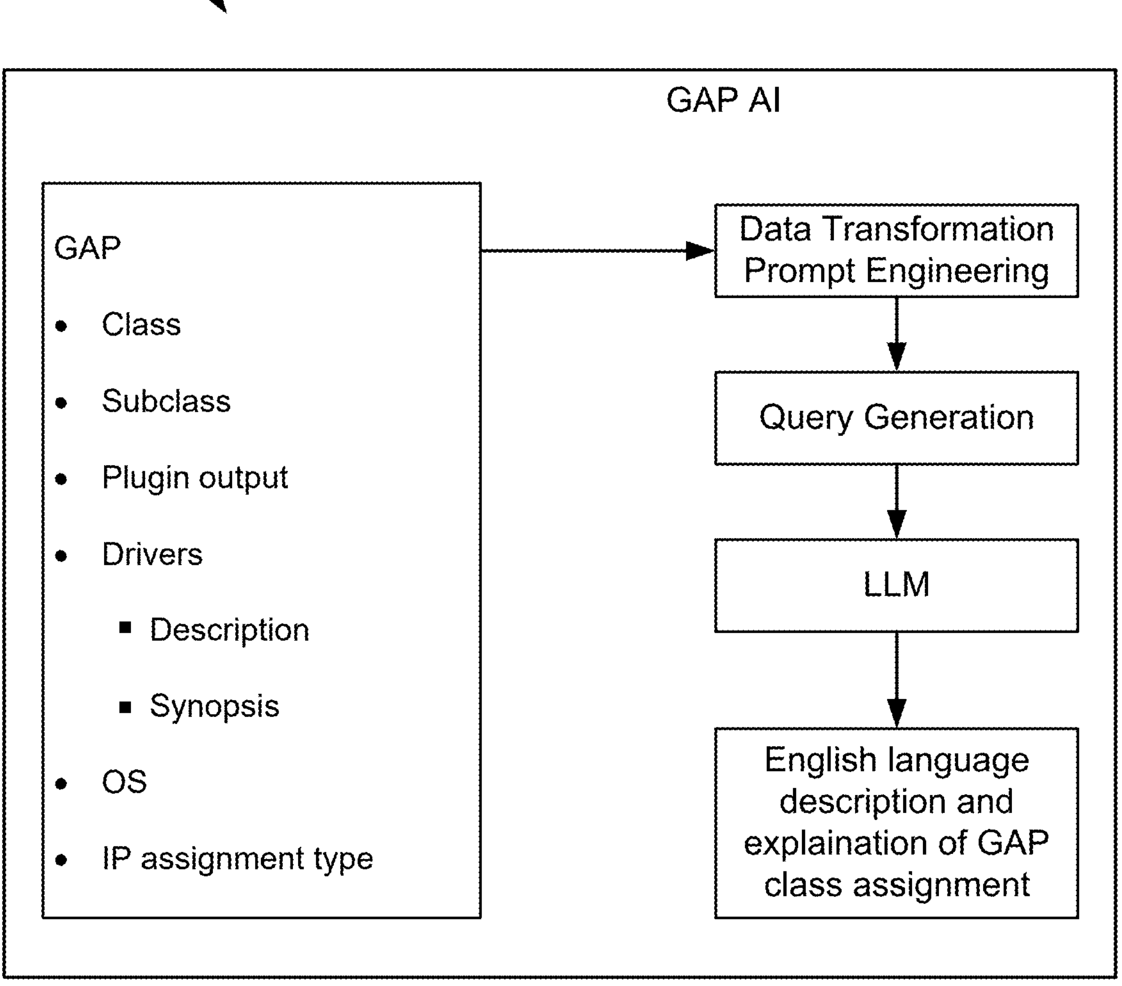
FIG. 13 illustrates an example of applying generative AI to a GAP, according to aspects of the disclosure.

FIG. 13 illustrates an example of applying generative AI to a GAP, according to aspects of the disclosure. In this example, the GAP includes classes, subclasses, plugin outputs, drivers with descriptions and synopses, and operating systems (OS) with IP assignment types. In some aspects, data transformation and prompt engineering may be applied to the GAP before it is fed to a GenAI model, such as the VertexAI (tex-bison) model, as shown in FIG. 13. An English-language description and explanation of GAP class assignment may be generated by the GenAI model.

In some aspects, classification and categorization of assets and identification of asset owners may be applicable for various scenarios. For example, the disclosed systems and methods may be applicable to:

- operating system fingerprinting
- discovery of services exported by a given host (remote or authenticated scan, e.g., LDAP, Kerberos, DNS, etc.)
- enumerating user accounts locally provisioned on the device and their groups and permissions
- host active directory configuration
- host network configuration (e.g., interface name, IP v4, v6 addresses and type of IP address assignment: static/dynamic)

In some aspects, in addition or as alternatives to Nessus®, NNM, and MSFT AD data sources described above, identity data may be obtained from an Endpoint agent, alternative remote or local device scans, CMDBs, IRM solutions, network traffic and monitoring solutions (e.g., NDR), passive NetFlow collectors and aggregators, etc. Thus, methods and systems according to aspects of the disclosure may be applied to a large variety of data sources to achieve asset classification, categorization, and owner discovery, thus providing automatic cyber asset management on a variety of platforms in a variety of scenarios.

In some aspects, methods and systems according to aspects of the disclosure may be applied to asset management systems including but not limited to:

- CMDB reconciliation
- asset registers and input asset management systems

In some aspects, asset class/subclass, owner, administrator, and/or location may also be used in other IRM and asset management systems such as CMDB to solve the problem of CMDB reconciliation (which, in some scenarios, may present a problem when multiple CMDBs are maintained by different teams within an organization and may not always be synchronous with one another).

In some aspects, methods and systems according to aspects of the disclosure may be applied to assist in routing, prioritization and reporting. For example, identifying the person who owns a device may be relevant to vulnerability management to facilitate responsibilities such as patch management.

In some aspects, methods and systems according to aspects of the disclosure may be applied to leverage the software installed on each device within an organization. For example, software installed on a device may be used as a surrogate to Nessus® plugins scan data.

In some aspects, a confidence value of GAP decision algorithm for identifying the owner of a digital asset is provided. In some aspects, based on Nessus® plugins and Nessus® plugin-parsed output, the following items may be gathered whenever possible:

- if a device has a specialized HW and what class or subclass it indicates,
- the operating system the device runs and what class or subclass it indicates
- the network ports open and the service running on these ports, the software running on the device (e.g. SQL server, Oracle server, or OPC-UA, MODBUS protocols, which indicate OT-IIoT class) the network configuration of the device, and in particular if it has statically or dynamically assigned (DHCP) IP address
- if the operating system is running within the context of a virtual machine or directly on bare HW.

In some aspects, the GAP decision algorithm maintains a data structure GAP_FINAL (a hash table or SQL table with where each device is associated with one entry and keyed by DEVICE_IDENTIFIER. For each device, the following attributes are maintained. Initially all empty.

- DEVICE IDENTIFIER (device uuid)
- DEVICE GAP_CLASS—(one of
- DEVICE GAP SUBCLASS
- DEVICE GAP_DRIVERS (a list of plugins used by the decision tree to assign GAP_CLASS and SUBCLASS)
- DEVICE GAP_CONFIDENCE—numerical value between 1% and 99% used to indicate the certainty in the assignment of the class and subclass.

In some aspects, the order of classification (assignment of class and subclass) matters as that is the priority of assigning class and also if subclass accumulation matters or not. In some classes, the subclasses (or categories) are accumulated. Other classes allow only one subclass (e.g., PCDs, where a device is either LAPTOP_DESKTOP, or VIRTUAL MACHINE, or MOBILE_DEVICE).

In some aspects, GAP confidence is related to detection and the confidence of detection of hardware, OS, network configuration, and applications or protocols that the devices runs and can communicate with.

In some aspects, GAP confidence may depend on the type of customer premises equipment (CPE) to which the device belongs. There is a difference between special purpose and general purpose devices.

GAP classifies special purpose operating systems that indicate functionality in various classes and subclasses. For example,

- CISCO IP Telephone;
- CISCO Unified IP Telephone;
- Cisco SIP Device;
- Mitel SIP Device;
- Polycom VVX Phone;
- Grandstream VOIP Phone;
- ADTRAN SIP Device;
- Alcatel-Lucent SIP Device; or
- other telephones may indicate class TELECOMMUNICATION_DEVICE, SUBCLASS PHONE.

F5 Networks BIG-IP indicate class=NETWORK_INFRASTRUCTURE subclass LOAD-_BALANCER.

IBMz/OS implies class-COMPUTE and APPLICATION SERVER, subclass MAINFRAME.

There is a large set of operating systems that are general purpose. They are separated onto distinct sets that only imply a class but the information is not sufficient to assign the class.

General purpose operating systems sets are:

- Legacy operating systems (exact list of operating systems that have reached and passed end-of-lie),
- Server-Grade-OS (including a large set of Linux distributions, Solaris, AIX, and tens of other operating system)
- PCD-grade-OS (including macOS, Windows 7, 8, 11, etc.)
- CLOUD-images In some aspects, decision tree logic with network information and confidence may be provided.

In some aspects, the order of processing device information is:

A. Is it possible NI or NI_VM device?

a. then execute BLOCK 1. NI, NI_VM PROCESSING

B. Is it likely CAS or CASVM device
   a. then execute BLOCK 2. CAS and CASVM PROCESSING
C. Is it likely a PCD (based on OS check)
   a. then execute BLOCK 3. PCD
D. Is it likely an IoT device (based on OS check)
   a. then execute BLOCK 4. IoT
E. Is it likely a PERIPHERAL device (based on OS check)
   a. then execute BLOCK 5. PERIPHERA
F. Is it likely an OT_IIOT device
   a. then execute BLOCK 6. OT-IIoT
G. Is it likely an TELECOMM_DEVICE device
   a. then execute BLOCK 7. TELECOMM_DEVICE
H. Is it likely a HEALTHCARE device (based on OS check)
   a. then execute BLOCK 8. HEALTHCARE_DEVICE
I. Is it possible a LEGACY_SYSTEM (based on OS check version)
   a. then execute BLOCK 9. LEGACY_SYSTEM
J. Is it a CLOUD device (based on OS check version, device UUID, Bios and other Tenable sources such as environment, etc.)
   a. then execute BLOCK 10. CLOUD
K. If device does not have class/subclass/drivers assigned
   a. then execute BLOCK 10. CLOUD

BLOCK 1. NI, NI_VM PROCESSING:

NETWORK_INFRASTRUCTURE PROCESSING

If the device is likely Network Infrastructure but the likely subclass is DS/NTP/DNS/Domain Controller/DHCP, then Server OS tables and Network Information is required to assign class/subclass.

Domain Controllers, DHCP, DNS, DS, NTP servers require server grade general-purpose OS.

```
If asset has SERVER OS
if      IPv4 address assignment type == STATIC
then    asset class=NI
        GAP__CONFIDENCE based on confidence of OS
if      IPv4 address assignment type == DYNAMIC
then    asset class=VIRTUAL__MACHINE__WORKLOAD
        GAP__CONFIDENCE based on OS, NI
if      IPv4 address assignment type == UNKNOWN
then    asset__class = NI
        GAP__CONFIDENCE reduced
```

Device is assigned class=NI_VM if it is determined that the OS is running in the context of a virtual machine.

BLOCK 2. CAS and CASVM PROCESSING (does not override NETWORK_INFRASTURCTURE class)

CASVM is a subset of CAS when device is a member VM table also

```
if      IPv4 address assignment type == STATIC
then    asset class=CAS or CASVM
        GAP__CONFIDENCE based on OS, NI
if      IPv4 address assignment type == DYNAMIC
then    asset class=VIRTUAL__MACHINE__WORKLOAD
        GAP__CONFIDENCE based on OS, NI
if      IPv4 address assignment type == UNKNOWN
then    asset__class = CAS or CASVM
        GAP__CONFIDENCE Reduced
```

BLOCK 3. PCD

```
- If the device is a VM then the subclass = VM
- Else subclass=LAPTOP__DESKTOP
```

PCD device can have only one subclass.

No accumulation of subclasses allowed and a device in PCD class belongs to one class only.

PCD overwrites CAS, CASVM, and NI and NI_VM subclasses (note that it is not uncommon to install a VPN server on a given machine but that does not make it a NI. VPN server.

```
if      IPv4 address assignment type == DYNAMIC
then    asset class=PCD
        GAP__CONFIDENCE based on OS, Network Information
if      IPv4 address assignment type == STATIC
then    asset class=VIRTUAL__MACHINE__WORKLOAD
        GAP__CONFIDENCE based on OS, Network Information
if      IPv4 address assignment type == UNKNOWN
then    asset__class = PCD
        GAP__CONFIDENCE reduced
```

BLOCK 4. IOT

```
- If a device that is likely an IoT device then the subclasses are
accumulated.
- If the device is also a VM then category = VM.
```

This can happen for a IoT management station or a bridge.

IoT class overrides prior class assignment.

BLOCK 5. PERIPHERAL

```
(categories/subclasses are accumulated;
overrides GAP__FINAL class
If device is a ROUTER__SWITCH__WAP only device then
   class=NI
Else
   class=PERIPHERAL
```

BLOCK 6. OT_IIOT does NOT override GAP_FINAL adds only new devices and checks for VM and assigns VM subclass ot new OT_IIOT devices

BLOCK 7. TELECOMM_DEVICES does NOT override GAP_FINAL adds new devices only checks if they are VM and adds VM to subclass.

BLOCK 8. HEALTHCARE_DEVICES does NOT override GAP_FINAL adds new devices only and checks if they are VM and adds VM to subclass.

BLOCK 9. LEGACY_SYSTEM overrides CLASS to LEGACY_SYSTEM.

Accumulates subclass (indication of functionality)

Accumulates drivers extends the subclass by adding to the existing subclass array all the

LEGACY_SYSTEM.SUBCLASS check if device is VM and adds the VM to subclass

BLOCK 10. CLOUD

Overrides the CLASS to CLOUD. Extends the GAP_FINAL subclass array with the subclass of the CLOUD class when the device is already classified (that is it belongs to GAP_FINAL).

BLOCK 11. LEFTOVERS processing

Leftovers are devices not yet assigned class and subclass. They can be virtual machines, devices possibly running general purpose server-grade operating systems, or some services and protocols running on the device (indicating CAS).

1. if device is a VIRTUAL MACHINE and has some CASfunctionality=>
   i. class=VIRTUAL_MACHINE_WORKLOAD.
   ii. subclass=cas_subclasses; accumulate drivers
2. Elif device in VMS and SERVER_OS leftover=>CASVM.UNDEFINED; accumulate drivers
3. Elif device in VMS=>
   i. class=VMS;
   ii. subclass=UNDEFINED; accumulate drivers
4. Elif device has CAS functionality=>
   i. class=UNDEFINED
   ii. subclass=functionality; accumulate drivers
5. Elif device has SERVER_LIKE_OS=>
   i. class=CAS
   ii. subclass=UNDEFINED GAP Confidence In some aspects, there are two components feeding into GAP confidence:

1. The confidence of the sensor in producing the specific aspects of a device, e.g. HW detection, OS detection, Application-Protocol detection, e.g. NESSUS_HW_CONFIDENCE, NESSUS_OS_CONFIDENCE. Detecting if a network protocol is enabled or an application is running is trivial and the confidence of any sensor reporting application running/application installed is high.
2. The confidence of GAP producing classification based on the type of data it is using, e.g. GAP_HW_CONFIDENCE, GAP_OS_CONFIDENCE, GAP_NI_CONFIDENCE, GAP_NO_OS_BASE.

In some aspects, hardware, operating system, and/or application software may be running or present.

In the case of Nessus plugins, there are NESSUS_HW_CONFIDENCE (for plugins that identify HW CPE-common platform enumeration) and NESSUS_OS_CONFIDENCE.

In some aspects, the assessment of whether an application is running or installed is an easy task, and a sensor detecting an application running or installed may have a confidence value of 100%.

If GAP uses hardware detection (e.g., uses only specialized hardware, not ARM or x86), then GAP has a high confidence in the classification that is by multiplying SENSOR_HW_CONFIDENCE x GAP_HW_CONFIDENCE (which may be 99%).

Special Purpose HW

If GAP classification depends on special-purpose HW detection (after refactoring GAP to work with CPE) such as Enterprise grade switches, UPS devices, Integrated management controllers, load-balancers, etc., then GAP_CONFIDENCE is high.

Special Purpose OS

If GAP classification depends on OS detection and OS is a special-purpose operating system (meaning that it is not a general-purpose OS), then the confidence is high, but depends also on the confidence of detecting the operating system. (GAP classifies operating systems as server-grade general-purpose operating systems, PCD-grade general-purpose operating systems, and legacy-systems. Other operating systems may be classified as special purpose OS.)

General Purpose OS and Network Information

If GAP classification depends on detection of a general-purpose OS and Network Information (used for class NI, NI_VM, CAS, CASVM, and PCD, and VMW)

#This value if the confidence level of 11936

NESSUS_OS_CONFIDENCE=READ FROM BASE TABLE

NESSUS_HW_CONFIDENCE=100 (Because plugins with high confidence are selected)

GAP_NO_OS_BASE=80

#Weight of factors wrt GAP

GAP_HW_WEIGHT=0.98

GAP_OS_WEIGHT=0.95

GAP_NO_IP_REDUCTION=0.95

Examples of formulas are as follows:

1. IF HW based detection=>GAP_HW_WEIGHT*NESSUS_HW_CONFIDENCE
2. If we know the OS, and classification depends on IP assignment and IP assignment is present: GAP_CONFIDENCE=NESSUS_OS_CONFIDENCE*GAP_OS_WEIGHT
3. If we know the OS and the classification depends on IP assignment and IP assignment is NOT present GAP_CONFIDENCE=NESSUS_OS_CONFIDENCE*GAP_OS_WEIGHT*G
4. If we know the OS and the classification DOES NOT depend on IP assignment then GAP_CONFIDENCE=NESSUS_OS_CONFIDENCE*GAP_OS_WEIGHT
5. If we do not know the OS but the classification depends on HW level services, at the present NETWORK INFRASTRUCTURE SAN, IM, but excludes VPN, then GAP_CONFIDENCE=NESSUS_NI_CONFIDENCE*GAP_NI_WEIGHT In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of determining an owner of a digital asset, comprising: generating an identification for a personal account based at least in part on user-asset heuristics, wherein the personal account is heuristically distinguished from an administrative account based at least in part on a number of users associated with an account that is either the personal account or the administrative account; and determining an owner identity of the owner associated with the personal account by linking the identification with an identity in a data source based at least in part on one or more heuristically determined identity attributes.

Clause 2. The method of clause 1, wherein generating the identification for the personal account comprises: generating the identification for the personal account based at least in part on a taxonomy of a plurality of classes of devices.

Clause 3. The method of clause 2, wherein generating the identification for the personal account further comprises: generating the identification for the personal account based at least in part on a taxonomy of a plurality of subclasses of devices within one or more of the classes of devices.

Clause 4. The method of any of clauses 2 to 3, wherein the classes of devices include a class of personal computing devices (PCDs).

Clause 5. The method of clause 4, wherein the class of PCDs includes a subclass of laptop or desktop computers and a subclass of mobile devices.

Clause 6. The method of any of clauses 4 to 5, wherein the classes of devices further include: a class of network infrastructure (NI) devices; a class of network infrastructure virtual machines (NIVMs); a class of compute and application servers (CASs); a class of compute and application servers virtual machines (CASVMs); a class of peripheral devices; a class of virtual machine or workloads (VMWs); a class of cloud devices; a class of legacy systems; a class of Internet of Things (IoT) devices; a class of industrial IoT and operational technology (IIoT-OT); a class of telecommunication devices; and a class of health care devices (HCDs).

Clause 7. The method of any of clauses 1 to 6, wherein generating the identification for the personal account comprises: generating the identification for the personal account based at least in part on a global asset profile (GAP) of the digital asset.

Clause 8. The method of clause 7, wherein the GAP is a function on data associated with the digital asset from the data source.

Clause 9. The method of any of clauses 1 to 8, wherein the data source comprises: Tenable Nessus®; Tenable Nessus® Network Monitor (NNM); Microsoft Active Directory®; Lightweight Directory Access Protocol data source; a locally stored device network configuration; a locally stored user access configuration; or any combination thereof.

Clause 10. The method of any of clauses 1 to 9, wherein the identity attributes include: a name; a username; a title; a position; an email; a telephone number; a location; or any combination thereof.

Clause 11. The method of any of clauses 1 to 10, wherein determining the owner identity comprises obtaining information associated with a person who has logged on a personal computing device (PCD) locally or has been provisioned access to the PCD locally.

Clause 12. The method of any of clauses 1 to 11, wherein the user-asset heuristics comprise user-asset graph heuristics.

Clause 13. The method of any of clauses 1 to 12, further comprising: performing a vulnerability scan of the digital asset based on the owner identity.

Clause 14. The method of any of clauses 1 to 13, wherein the digital asset is assigned a class label and one or more subclass labels, wherein the class label comprises a class tag that identifies a type of the digital asset, and the one or more subclass labels comprise one or more subclass tags that identify one or more functionalities of the digital asset.

Clause 15. The method of clause 14, wherein the class label and the one or more subclass labels are determined by an unsupervised custom decision tree algorithm.

Clause 16. The method of any of clauses 1 to 15, further comprising: determining a confidence value of the owner identity.

Clause 17. The method of clause 16, wherein the confidence value is a global asset profile (GAP) device classification confidence value.

Clause 18. The method of any of clauses 1 to 17, further comprising: generating a natural-language description of the digital asset associated with the owner.

Clause 19. The method of clause 18, further comprising: applying an artificial intelligence (AI) or machine learning (ML) model to generate the natural-language description.

Clause 20. The method of clause 19, wherein the natural-language description includes: a description of the digital asset; one or more functionalities of the digital asset; a class of a device associated with the owner; a subclass of the device; an operating system provisioned; a description of a network configuration of the device; a domain controller; a device class label; one or more device subclass labels; or any combination thereof.

Clause 21. A component, comprising: one or more memories; and one or more processors communicatively coupled to the one or more memories, the one or more processors, either alone or in combination, configured to: generate an identification for a personal account based at least in part on user-asset heuristics, wherein the personal account is heuristically distinguished from an administrative account based at least in part on a number of users associated with an account that is either the personal account or the administrative account; and determine an owner identity of the owner associated with the personal account by linking the identification with an identity in a data source based at least in part on one or more heuristically determined identity attributes.

Clause 22. The component of clause 21, wherein the one or more processors configured to generate the identification for the personal account comprises the one or more processors, either alone or in combination, configured to: generate the identification for the personal account based at least in part on a taxonomy of a plurality of classes of devices.

Clause 23. The component of clause 22, wherein the one or more processors configured to generate the identification for the personal account comprises the one or more processors, either alone or in combination, configured to: generate the identification for the personal account based at least in part on a taxonomy of a plurality of subclasses of devices within one or more of the classes of devices.

Clause 24. The component of any of clauses 22 to 23, wherein the classes of devices include a class of personal computing devices (PCDs).

Clause 25. The component of clause 24, wherein the class of PCDs includes a subclass of laptop or desktop computers and a subclass of mobile devices.

Clause 26. The component of any of clauses 24 to 25, wherein the classes of devices further include: a class of network infrastructure (NI) devices; a class of network infrastructure virtual machines (NIVMs); a class of compute and application servers (CASs); a class of compute and application servers virtual machines (CASVMs); a class of peripheral devices; a class of virtual machine or workloads (VMWs); a class of cloud devices; a class of legacy systems; a class of Internet of Things (IoT) devices; a class of industrial IoT and operational technology (IIoT-OT); a class of telecommunication devices; and a class of health care devices (HCDs).

Clause 27. The component of any of clauses 21 to 26, wherein the one or more processors configured to generate the identification for the personal account comprises the one or more processors, either alone or in combination, configured to: generate the identification for the personal account based at least in part on a global asset profile (GAP) of the digital asset.

Clause 28. The component of clause 27, wherein the GAP is a function on data associated with the digital asset from the data source.

Clause 29. The component of any of clauses 21 to 28, wherein the data source comprises: Tenable Nessus®; Tenable Nessus® Network Monitor (NNM); Microsoft Active Directory®; Lightweight Directory Access Protocol data source; a locally stored device network configuration; a locally stored user access configuration; or any combination thereof.

Clause 30. The component of any of clauses 21 to 29, wherein the identity attributes include: a name; a username; a title; a position; an email; a telephone number; a location; or any combination thereof.

Clause 31. The component of any of clauses 21 to 30, wherein the one or more processors configured to determine the owner identity comprises the one or more processors, either alone or in combination, configured to obtain information associated with a person who has logged on a personal computing device (PCD) locally or has been provisioned access to the PCD locally.

Clause 32. The component of any of clauses 21 to 31, wherein the user-asset heuristics comprise user-asset graph heuristics.

Clause 33. The component of any of clauses 21 to 32, wherein the one or more processors, either alone or in combination, are further configured to: perform a vulnerability scan of the digital asset based on the owner identity.

Clause 34. The component of any of clauses 21 to 33, wherein the digital asset is assigned a class label and one or more subclass labels, wherein the class label comprises a class tag that identifies a type of the digital asset, and the one or more subclass labels comprise one or more subclass tags that identify one or more functionalities of the digital asset.

Clause 35. The component of clause 34, wherein the class label and the one or more subclass labels are determined by an unsupervised custom decision tree algorithm.

Clause 36. The component of any of clauses 21 to 35, wherein the one or more processors, either alone or in combination, are further configured to: determine a confidence value of the owner identity.

Clause 37. The component of clause 36, wherein the confidence value is a global asset profile (GAP) device classification confidence value.

Clause 38. The component of any of clauses 21 to 37, wherein the one or more processors, either alone or in combination, are further configured to: generate a natural-language description of the digital asset associated with the owner.

Clause 39. The component of clause 38, wherein the one or more processors, either alone or in combination, are further configured to: apply an artificial intelligence (AI) or machine learning (ML) model to generate the natural-language description.

Clause 40. The component of clause 39, wherein the natural-language description includes: a description of the digital asset; one or more functionalities of the digital asset; a class of a device associated with the owner; a subclass of the device; an operating system provisioned; a description of a network configuration of the device; a domain controller; a device class label; one or more device subclass labels; or any combination thereof.

Clause 41. A non-transitory computer-readable medium storing computer-executable instructions that, when executed by a component, cause the component to: generate an identification for a personal account based at least in part on user-asset heuristics, wherein the personal account is heuristically distinguished from an administrative account based at least in part on a number of users associated with an account that is either the personal account or the administrative account; and determine an owner identity of the owner associated with the personal account by linking the identification with an identity in a data source based at least in part on one or more heuristically determined identity attributes.

Clause 42. The non-transitory computer-readable medium of clause 41, wherein the computer-executable instructions that, when executed by the component, cause the component to generate the identification for the personal account comprise computer-executable instructions that, when executed by the component, cause the component to: generate the identification for the personal account based at least in part on a taxonomy of a plurality of classes of devices.

Clause 43. The non-transitory computer-readable medium of clause 42, wherein the computer-executable instructions that, when executed by the component, cause the component to generate the identification for the personal account comprise computer-executable instructions that, when executed by the component, cause the component to: generate the identification for the personal account based at least in part on a taxonomy of a plurality of subclasses of devices within one or more of the classes of devices.

Clause 44. The non-transitory computer-readable medium of any of clauses 42 to 43, wherein the classes of devices include a class of personal computing devices (PCDs).

Clause 45. The non-transitory computer-readable medium of clause 44, wherein the class of PCDs includes a subclass of laptop or desktop computers and a subclass of mobile devices.

Clause 46. The non-transitory computer-readable medium of any of clauses 44 to 45, wherein the classes of devices further include: a class of network infrastructure (NI) devices; a class of network infrastructure virtual machines (NIVMs); a class of compute and application servers (CASs); a class of compute and application servers virtual machines (CASVMs); a class of peripheral devices; a class of virtual machine or workloads (VMWs); a class of cloud devices; a class of legacy systems; a class of Internet of Things (IoT) devices; a class of industrial IoT and operational technology (IIoT-OT); a class of telecommunication devices; and a class of health care devices (HCDs).

Clause 47. The non-transitory computer-readable medium of any of clauses 41 to 46, wherein the computer-executable instructions that, when executed by the component, cause the component to generate the identification for the personal account comprise computer-executable instructions that, when executed by the component, cause the component to: generate the identification for the personal account based at least in part on a global asset profile (GAP) of the digital asset.

Clause 48. The non-transitory computer-readable medium of clause 47, wherein the GAP is a function on data associated with the digital asset from the data source.

Clause 49. The non-transitory computer-readable medium of any of clauses 41 to 48, wherein the data source comprises: Tenable Nessus®; Tenable Nessus® Network Monitor (NNM); Microsoft Active Directory®; Lightweight Directory Access Protocol data source; a locally stored device network configuration; a locally stored user access configuration; or any combination thereof.

Clause 50. The non-transitory computer-readable medium of any of clauses 41 to 49, wherein the identity attributes include: a name; a username; a title; a position; an email; a telephone number; a location; or any combination thereof.

Clause 51. The non-transitory computer-readable medium of any of clauses 41 to 50, wherein the computer-executable instructions that, when executed by the component, cause the component to determine the owner identity comprise computer-executable instructions that, when executed by the component, cause the component to obtain information associated with a person who has logged on a personal computing device (PCD) locally or has been provisioned access to the PCD locally.

Clause 52. The non-transitory computer-readable medium of any of clauses 41 to 51, wherein the user-asset heuristics comprise user-asset graph heuristics.

Clause 53. The non-transitory computer-readable medium of any of clauses 41 to 52, further comprising computer-executable instructions that, when executed by the component, cause the component to: perform a vulnerability scan of the digital asset based on the owner identity.

Clause 54. The non-transitory computer-readable medium of any of clauses 41 to 53, wherein the digital asset is assigned a class label and one or more subclass labels, wherein the class label comprises a class tag that identifies a type of the digital asset, and the one or more subclass labels comprise one or more subclass tags that identify one or more functionalities of the digital asset.

Clause 55. The non-transitory computer-readable medium of clause 54, wherein the class label and the one or more subclass labels are determined by an unsupervised custom decision tree algorithm.

Clause 56. The non-transitory computer-readable medium of any of clauses 41 to 55, further comprising computer-executable instructions that, when executed by the component, cause the component to: determine a confidence value of the owner identity.

Clause 57. The non-transitory computer-readable medium of clause 56, wherein the confidence value is a global asset profile (GAP) device classification confidence value.

Clause 58. The non-transitory computer-readable medium of any of clauses 41 to 57, further comprising computer-executable instructions that, when executed by the component, cause the component to: generate a natural-language description of the digital asset associated with the owner.

Clause 59. The non-transitory computer-readable medium of clause 58, further comprising computer-executable instructions that, when executed by the component, cause the component to: apply an artificial intelligence (AI) or machine learning (ML) model to generate the natural-language description.

Clause 60. The non-transitory computer-readable medium of clause 59, wherein the natural-language description includes: a description of the digital asset; one or more functionalities of the digital asset; a class of a device associated with the owner; a subclass of the device; an operating system provisioned; a description of a network configuration of the device; a domain controller; a device class label; one or more device subclass labels; or any combination thereof.

Clause 61. A component, comprising: means for generating an identification for a personal account based at least in part on user-asset heuristics, wherein the personal account is heuristically distinguished from an administrative account based at least in part on a number of users associated with an account that is either the personal account or the administrative account; and means for determining an owner identity of the owner associated with the personal account by linking the identification with an identity in a data source based at least in part on one or more heuristically determined identity attributes.

Clause 62. The component of clause 61, wherein the means for generating the identification for the personal account comprises: means for generating the identification for the personal account based at least in part on a taxonomy of a plurality of classes of devices.

Clause 63. The component of clause 62, wherein the means for generating the identification for the personal account further comprises: means for generating the identification for the personal account based at least in part on a taxonomy of a plurality of subclasses of devices within one or more of the classes of devices.

Clause 64. The component of any of clauses 62 to 63, wherein the classes of devices include a class of personal computing devices (PCDs).

Clause 65. The component of clause 64, wherein the class of PCDs includes a subclass of laptop or desktop computers and a subclass of mobile devices.

Clause 66. The component of any of clauses 64 to 65, wherein the classes of devices further include: a class of network infrastructure (NI) devices; a class of network infrastructure virtual machines (NIVMs); a class of compute and application servers (CASs); a class of compute and application servers virtual machines (CASVMs); a class of peripheral devices; a class of virtual machine or workloads (VMWs); a class of cloud devices; a class of legacy systems; a class of Internet of Things (IoT) devices; a class of industrial IoT and operational technology (IIoT-OT); a class of telecommunication devices; and a class of health care devices (HCDs).

Clause 67. The component of any of clauses 61 to 66, wherein the means for generating the identification for the personal account comprises: means for generating the identification for the personal account based at least in part on a global asset profile (GAP) of the digital asset.

Clause 68. The component of clause 67, wherein the GAP is a function on data associated with the digital asset from the data source.

Clause 69. The component of any of clauses 61 to 68, wherein the data source comprises: Tenable Nessus®; Tenable Nessus® Network Monitor (NNM); Microsoft Active Directory®; Lightweight Directory Access Protocol data source; a locally stored device network configuration; a locally stored user access configuration; or any combination thereof.

Clause 70. The component of any of clauses 61 to 69, wherein the identity attributes include: a name; a username; a title; a position; an email; a telephone number; a location; or any combination thereof.

Clause 71. The component of any of clauses 61 to 70, wherein the means for determining the owner identity comprises means for obtaining information associated with a person who has logged on a personal computing device (PCD) locally or has been provisioned access to the PCD locally.

Clause 72. The component of any of clauses 61 to 71, wherein the user-asset heuristics comprise user-asset graph heuristics.

Clause 73. The component of any of clauses 61 to 72, further comprising: means for performing a vulnerability scan of the digital asset based on the owner identity.

Clause 74. The component of any of clauses 61 to 73, wherein the digital asset is assigned a class label and one or more subclass labels, wherein the class label comprises a class tag that identifies a type of the digital asset, and the one or more subclass labels comprise one or more subclass tags that identify one or more functionalities of the digital asset.

Clause 75. The component of clause 74, wherein the class label and the one or more subclass labels are determined by an unsupervised custom decision tree algorithm.

Clause 76. The component of any of clauses 61 to 75, further comprising: means for determining a confidence value of the owner identity.

Clause 77. The component of clause 76, wherein the confidence value is a global asset profile (GAP) device classification confidence value.

Clause 78. The component of any of clauses 61 to 77, further comprising: means for generating a natural-language description of the digital asset associated with the owner.

Clause 79. The component of clause 78, further comprising: means for applying an artificial intelligence (AI) or machine learning (ML) model to generate the natural-language description.

Clause 80. The component of clause 79, wherein the natural-language description includes: a description of the digital asset; one or more functionalities of the digital asset; a class of a device associated with the owner; a subclass of the device; an operating system provisioned; a description of a network configuration of the device; a domain controller; a device class label; one or more device subclass labels; or any combination thereof.

Additional details that relate to the techniques that can be used to facilitate usage of natural language for cyber asset management are described and illustrated in the Appendix attached hereto, the contents of which are expressly incorporated herein by reference in their entirety.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line, or wireless technologies such as infrared, radio, and microwave, then the coaxial cable, fiber optic cable, twisted pair, digital subscriber line, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of determining an owner of a digital asset, comprising:

generating an identification for a personal account based at least in part on user-asset heuristics, wherein the personal account is heuristically distinguished from an administrative account based at least in part on a number of users associated with an account that is either the personal account or the administrative account; and determining an owner identity of the owner associated with the personal account by linking the identification with an identity in a data source based at least in part on one or more heuristically determined identity attributes.

2. The method of claim 1, wherein generating the identification for the personal account comprises:

generating the identification for the personal account based at least in part on a taxonomy of a plurality of classes of devices.

3. The method of claim 2, wherein generating the identification for the personal account further comprises:

generating the identification for the personal account based at least in part on a taxonomy of a plurality of subclasses of devices within one or more of the classes of devices.

4. The method of claim 2, wherein the classes of devices include a class of personal computing devices (PCDs).

5. The method of claim 4, wherein the class of PCDs includes a subclass of laptop or desktop computers and a subclass of mobile devices.

6. The method of claim 4, wherein the classes of devices further include:

a class of network infrastructure (NI) devices;

a class of network infrastructure virtual machines (NIVMs);

a class of compute and application servers (CASs);

a class of compute and application servers virtual machines (CASVMs);

a class of peripheral devices;

a class of virtual machine or workloads (VMWs);

a class of cloud devices;

a class of legacy systems;

a class of Internet of Things (IoT) devices;

a class of industrial IOT and operational technology (IIoT-OT);

a class of telecommunication devices; and a class of health care devices (HCDs).

7. The method of claim 1, wherein generating the identification for the personal account comprises:

generating the identification for the personal account based at least in part on a global asset profile (GAP) of the digital asset.

8. The method of claim 7, wherein the GAP is a function on data associated with the digital asset from the data source.

9. The method of claim 1, wherein the data source comprises:

Tenable Nessus®;

Tenable Nessus® Network Monitor (NNM);

Microsoft Active Directory®;

Lightweight Directory Access Protocol data source;

a locally stored device network configuration;

a locally stored user access configuration;

or any combination thereof.

10. The method of claim 1, wherein the identity attributes include:

a name;

a username;

a title;

a position;

a manager;

an email;

a telephone number;

a location;

or any combination thereof.

11. The method of claim 1, wherein determining the owner identity comprises obtaining information associated with a person who has logged on a personal computing device (PCD) locally or has been provisioned access to the PCD locally.

12. The method of claim 1, wherein the user-asset heuristics comprise user-asset graph heuristics.

13. The method of claim 1, further comprising:

performing a vulnerability scan of the digital asset based on the owner identity.

14. The method of claim 1, wherein the digital asset is assigned a class label and one or more subclass labels, wherein the class label comprises a class tag that identifies a type of the digital asset, and the one or more subclass labels comprise one or more subclass tags that identify one or more functionalities of the digital asset.

15. The method of claim 14, wherein the class label and the one or more subclass labels are determined by an unsupervised custom decision tree algorithm.

16. The method of claim 1, further comprising:

determining a confidence value of the owner identity.

17. The method of claim 16, wherein the confidence value is a global asset profile (GAP) device classification confidence value.

18. The method of claim 1, further comprising:

generating a natural-language description of the digital asset associated with the owner.

19. The method of claim 18, further comprising:

applying an artificial intelligence (AI) or machine learning (ML) model to generate the natural-language description.

20. The method of claim 19, wherein the natural-language description includes:

a description of the digital asset;

one or more functionalities of the digital asset;

a class of a device associated with the owner;

a subclass of the device;

an operating system provisioned;

a description of a network configuration of the device;

a domain controller;

a device class label;

one or more device subclass labels;

or any combination thereof.

21. A component, comprising:

one or more memories; and one or more processors communicatively coupled to the one or more memories, the one or more processors, either alone or in combination, configured to:

generate an identification for a personal account based at least in part on user- asset heuristics, wherein the personal account is heuristically distinguished from an administrative account based at least in part on a number of users associated with an account that is either the personal account or the administrative account; and determine an owner identity of the owner associated with the personal account by linking the identification with an identity in a data source based at least in part on one or more heuristically determined identity attributes.

22. The component of claim 21, wherein the one or more processors configured to generate the identification for the personal account comprises the one or more processors, either alone or in combination, configured to:

generate the identification for the personal account based at least in part on a taxonomy of a plurality of classes of devices.

23. The component of claim 22, wherein the one or more processors configured to generate the identification for the personal account comprises the one or more processors, either alone or in combination, configured to:

generate the identification for the personal account based at least in part on a taxonomy of a plurality of subclasses of devices within one or more of the classes of devices.

24. The component of claim 22, wherein the classes of devices include a class of personal computing devices (PCDs).

25. The component of claim 24, wherein the class of PCDs includes a subclass of laptop or desktop computers and a subclass of mobile devices.

26. The component of claim 24, wherein the classes of devices further include:

a class of network infrastructure (NI) devices;

a class of network infrastructure virtual machines (NIVMs);

a class of compute and application servers (CASs);

a class of compute and application servers virtual machines (CASVMs);

a class of peripheral devices;

a class of virtual machine or workloads (VMWs);

a class of cloud devices;

a class of legacy systems;

a class of Internet of Things (IoT) devices;

a class of industrial IOT and operational technology (IIoT-OT);

a class of telecommunication devices; and a class of health care devices (HCDs).

27. The component of claim 21, wherein the one or more processors configured to generate the identification for the personal account comprises the one or more processors, either alone or in combination, configured to:

generate the identification for the personal account based at least in part on a global asset profile (GAP) of the digital asset.

28. The component of claim 27, wherein the GAP is a function on data associated with the digital asset from the data source.

29. The component of claim 21, wherein the data source comprises:

Tenable Nessus®;

Tenable Nessus® Network Monitor (NNM);

Microsoft Active Directory®;

Lightweight Directory Access Protocol data source;

a locally stored device network configuration;

a locally stored user access configuration;

or any combination thereof.

30. The component of claim 21, wherein the identity attributes include:

a name;

a username;

a title;

a position;

a manager;

an email;

a telephone number;

a location;

or any combination thereof.

31. The component of claim 21, wherein the one or more processors configured to determine the owner identity comprises the one or more processors, either alone or in combination, configured to obtain information associated with a person who has logged on a personal computing device (PCD) locally or has been provisioned access to the PCD locally.

32. The component of claim 21, wherein the user-asset heuristics comprise user- asset graph heuristics.

33. The component of claim 21, wherein the one or more processors, either alone or in combination, are further configured to:

perform a vulnerability scan of the digital asset based on the owner identity.

34. The component of claim 21, wherein the digital asset is assigned a class label and one or more subclass labels, wherein the class label comprises a class tag that identifies a type of the digital asset, and the one or more subclass labels comprise one or more subclass tags that identify one or more functionalities of the digital asset.

35. The component of claim 34, wherein the class label and the one or more subclass labels are determined by an unsupervised custom decision tree algorithm.

36. The component of claim 21, wherein the one or more processors, either alone or in combination, are further configured to:

determine a confidence value of the owner identity.

37. The component of claim 36, wherein the confidence value is a global asset profile (GAP) device classification confidence value.

38. The component of claim 21, wherein the one or more processors, either alone or in combination, are further configured to:

generate a natural-language description of the digital asset associated with the owner.

39. The component of claim 38, wherein the one or more processors, either alone or in combination, are further configured to:

apply an artificial intelligence (AI) or machine learning (ML) model to generate the natural-language description.

40. The component of claim 39, wherein the natural-language description includes:

a description of the digital asset;
one or more functionalities of the digital asset;
a class of a device associated with the owner;
a subclass of the device;
an operating system provisioned;
a description of a network configuration of the device;
a domain controller;
a device class label;
one or more device subclass labels;
or any combination thereof.

41. A non-transitory computer-readable medium storing computer-executable instructions that, when executed by a component, cause the component to:

generate an identification for a personal account based at least in part on user-asset heuristics, wherein the personal account is heuristically distinguished from an administrative account based at least in part on a number of users associated with an account that is either the personal account or the administrative account; and determine an owner identity of the owner associated with the personal account by linking the identification with an identity in a data source based at least in part on one or more heuristically determined identity attributes.

42. The non-transitory computer-readable medium of claim 41, wherein the computer-executable instructions that, when executed by the component, cause the component to generate the identification for the personal account comprise computer-executable instructions that, when executed by the component, cause the component to:

generate the identification for the personal account based at least in part on a taxonomy of a plurality of classes of devices.

43. The non-transitory computer-readable medium of claim 42, wherein the computer-executable instructions that, when executed by the component, cause the component to generate the identification for the personal account comprise computer-executable instructions that, when executed by the component, cause the component to:

generate the identification for the personal account based at least in part on a taxonomy of a plurality of subclasses of devices within one or more of the classes of devices.

44. The non-transitory computer-readable medium of claim 42, wherein the classes of devices include a class of personal computing devices (PCDs).

45. The non-transitory computer-readable medium of claim 44, wherein the class of PCDs includes a subclass of laptop or desktop computers and a subclass of mobile devices.

46. The non-transitory computer-readable medium of claim 44, wherein the classes of devices further include:

a class of network infrastructure (NI) devices;
a class of network infrastructure virtual machines (NIVMs);
a class of compute and application servers (CASs);
a class of compute and application servers virtual machines (CASVMs);
a class of peripheral devices;
a class of virtual machine or workloads (VMWs);
a class of cloud devices;
a class of legacy systems;
a class of Internet of Things (IoT) devices;
a class of industrial IoT and operational technology (IIoT-OT);
a class of telecommunication devices; and
a class of health care devices (HCDs).

47. The non-transitory computer-readable medium of claim 41, wherein the computer-executable instructions that, when executed by the component, cause the component to generate the identification for the personal account comprise computer-executable instructions that, when executed by the component, cause the component to:

generate the identification for the personal account based at least in part on a global asset profile (GAP) of the digital asset.

48. The non-transitory computer-readable medium of claim 47, wherein the GAP is a function on data associated with the digital asset from the data source.

49. The non-transitory computer-readable medium of claim 41, wherein the data source comprises:

Tenable Nessus®;
Tenable Nessus® Network Monitor (NNM);
Microsoft Active Directory®;
Lightweight Directory Access Protocol data source;
a locally stored device network configuration;
a locally stored user access configuration;
or any combination thereof.

50. The non-transitory computer-readable medium of claim 41, wherein the identity attributes include:

a name;
a username;
a title;
a position;
a manager;
an email;
a telephone number;
a location;
or any combination thereof.

* * * * *